(12) United States Patent
Nakamura et al.

(10) Patent No.: US 12,099,207 B2
(45) Date of Patent: Sep. 24, 2024

(54) VIRTUAL IMAGE DISPLAY DEVICE

(71) Applicants: Naoki Nakamura, Saitama (JP); Shiori Ohsugi, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP); Satomi Tanaka, Kanagawa (JP); Masahiro Itoh, Kanagawa (JP); Yoshifumi Sudoh, Kanagawa (JP); Susumu Momma, Kanagawa (JP); Shun Okazaki, Kanagawa (JP)

(72) Inventors: Naoki Nakamura, Saitama (JP); Shiori Ohsugi, Kanagawa (JP); Shigenobu Hirano, Kanagawa (JP); Yasuo Katano, Kanagawa (JP); Kenji Kameyama, Kanagawa (JP); Norikazu Igarashi, Kanagawa (JP); Aino Hasegawa, Kanagawa (JP); Satomi Tanaka, Kanagawa (JP); Masahiro Itoh, Kanagawa (JP); Yoshifumi Sudoh, Kanagawa (JP); Susumu Momma, Kanagawa (JP); Shun Okazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 589 days.

(21) Appl. No.: 17/310,215

(22) PCT Filed: Mar. 18, 2020

(86) PCT No.: PCT/IB2020/052444
§ 371 (c)(1),
(2) Date: Jul. 26, 2021

(87) PCT Pub. No.: WO2020/188487
PCT Pub. Date: Sep. 24, 2020

(65) Prior Publication Data
US 2022/0057640 A1  Feb. 24, 2022

(30) Foreign Application Priority Data

Mar. 20, 2019 (JP) ................................. 2019-053317
Feb. 6, 2020 (JP) ................................. 2020-018516

(51) Int. Cl.
*G02B 27/09* (2006.01)
*G02B 27/01* (2006.01)
*G02B 27/30* (2006.01)

(52) U.S. Cl.
CPC ......... *G02B 27/0955* (2013.01); *G02B 27/30* (2013.01); *G02B 27/0172* (2013.01)

(58) Field of Classification Search
CPC . G02B 27/0955; G02B 27/30; G02B 27/0172
(Continued)

(56) References Cited

U.S. PATENT DOCUMENTS 6,497,488 B1    12/2002  Yamauchi et al.
2002/0135729 A1  9/2002  Tokita et al.
(Continued)

FOREIGN PATENT DOCUMENTS

CN    104049366 A    9/2014
CN    104204905 A    12/2014
(Continued)

OTHER PUBLICATIONS

Notice of Allowance issued Jun. 27, 2023 in corresponding Chinese Patent Application No. CN202080021858.X.
(Continued)

*Primary Examiner* — Jerry L Brooks
(74) *Attorney, Agent, or Firm* — XSENSUS LLP

(57) ABSTRACT

A virtual image display device includes: an image display element that displays an image to be displayed as a virtual
(Continued)

image; a propagation optical system that propagates light from the image display element; and a light guide member that guides the light propagated by the propagation optical system. The light guide member includes: a light beam incident part that introduces light including image information from the propagation optical system into the light guide member; an image extractor that extracts the light including image information from an inside of the light guide member; and an image emitter that emits the light including image information to an outside of the light guide member. The propagation optical system includes one or more optical members each having a curved surface shape that is non-rotationally symmetric with respect to an optical axis.

20 Claims, 28 Drawing Sheets

(58) Field of Classification Search
USPC .......................................................... 359/629
See application file for complete search history.

(56) References Cited

U.S. PATENT DOCUMENTS

| | | | |
|---|---|---|---|
| 2003/0086135 A1* | 5/2003 | Takeyama | G02B 27/0081 359/32 |
| 2003/0098945 A1 | 5/2003 | Sugimoto et al. | |
| 2003/0165017 A1 | 9/2003 | Amitai | |
| 2003/0222980 A1 | 12/2003 | Miyagaki et al. | |
| 2006/0181671 A1 | 8/2006 | Sugimoto et al. | |
| 2007/0008495 A1 | 1/2007 | Miyagaki et al. | |
| 2009/0231663 A1 | 9/2009 | Hirano et al. | |
| 2010/0260455 A1 | 10/2010 | Pascal et al. | |
| 2012/0086623 A1 | 4/2012 | Takagi et al. | |
| 2012/0086625 A1 | 4/2012 | Takeda et al. | |
| 2014/0071539 A1 | 3/2014 | Gao | |
| 2014/0267636 A1 | 9/2014 | Takagi et al. | |
| 2014/0268072 A1 | 9/2014 | Takahashi et al. | |
| 2015/0178950 A1 | 6/2015 | Kakinuma et al. | |
| 2015/0338660 A1 | 11/2015 | Mukawa | |
| 2016/0116735 A1 | 4/2016 | Hayashi et al. | |
| 2016/0178909 A1 | 6/2016 | Komatsu et al. | |
| 2016/0266384 A1 | 9/2016 | Nakamura et al. | |
| 2016/0299344 A1 | 10/2016 | Dobschal et al. | |
| 2016/0320619 A1 | 11/2016 | Watanabe | |
| 2017/0003506 A1 | 1/2017 | Miyatake et al. | |
| 2017/0023791 A1 | 1/2017 | Kondo | |
| 2017/0090094 A1 | 3/2017 | Ohsugi et al. | |
| 2017/0099860 A1 | 4/2017 | Kaneko et al. | |
| 2017/0154406 A1 | 6/2017 | Atsuumi et al. | |
| 2017/0180685 A1 | 6/2017 | Takagi et al. | |
| 2017/0192239 A1 | 7/2017 | Nakamura et al. | |
| 2017/0227761 A1 | 8/2017 | Nakamura et al. | |
| 2017/0299860 A1 | 10/2017 | Wall et al. | |
| 2017/0315357 A1 | 11/2017 | Katano et al. | |
| 2017/0328733 A1 | 11/2017 | Gotoh et al. | |
| 2017/0345391 A1 | 11/2017 | Usui et al. | |
| 2018/0299672 A1 | 10/2018 | Yatsu et al. | |
| 2018/0335624 A1 | 11/2018 | Nakayama et al. | |
| 2018/0373025 A1 | 12/2018 | Miyatake et al. | |
| 2019/0004235 A1 | 1/2019 | Ohsugi et al. | |
| 2019/0004317 A1 | 1/2019 | Komatsu et al. | |
| 2019/0156454 A1 | 5/2019 | Atsuumi et al. | |
| 2019/0204591 A1 | 7/2019 | Nakamura et al. | |
| 2019/0353908 A1 | 11/2019 | Igarashi et al. | |
| 2020/0400962 A1 | 12/2020 | Hirano et al. | |

FOREIGN PATENT DOCUMENTS

| | | | | |
|---|---|---|---|---|
| CN | 104423044 A | 3/2015 | | |
| CN | 104813218 A | 7/2015 | | |
| CN | 105765443 A | 7/2016 | | |
| CN | 106371203 A | 2/2017 | | |
| CN | 106896501 A | 6/2017 | | |
| CN | 106932900 A | 7/2017 | | |
| CN | 108292039 A | 7/2018 | | |
| CN | 109073882 A | 12/2018 | | |
| EP | 2945002 A1 * | 11/2015 | ........... | G02B 27/017 |
| JP | 2001-255489 A | 9/2001 | | |
| JP | 2002-33276 A | 1/2002 | | |
| JP | 2008-58461 A | 3/2008 | | |
| JP | 2010-44172 A | 2/2010 | | |
| JP | 2012-083458 A | 4/2012 | | |
| JP | 2012-208193 A | 10/2012 | | |
| JP | 2013-37095 A | 2/2013 | | |
| JP | 2013-210633 A | 10/2013 | | |
| JP | 5421285 B2 | 2/2014 | | |
| JP | 5703875 B2 | 4/2015 | | |
| JP | 2015-87487 A | 5/2015 | | |
| JP | 2017-58400 A | 3/2017 | | |
| JP | 2017-122771 A | 7/2017 | | |
| JP | 2017-146448 | 8/2017 | | |
| JP | 2017-7686 A | 11/2017 | | |
| JP | 2019-12259 A | 1/2019 | | |
| JP | 2019-113839 A | 7/2019 | | |
| WO | 2014/109115 A1 | 7/2014 | | |

OTHER PUBLICATIONS

International Search Report issued on Jun. 26, 2020 in PCT/IB2020/052444 filed on Mar. 18, 2020, 10 pages.
Chinese Office Action issued Dec. 8, 2022, in corresponding Chinese Patent Application No. 202080021858.X, 16 pp.
Indian Office Action issued Dec. 8, 2022, in corresponding Indian Patent Application No. 202117039481, 6 pp.
Office Action issued Jul. 17, 2023 in Korean Patent Application No. 10-2021-7030290, 21 pages.
Japanese Office Action issued Sep. 5, 2023, in corresponding Japanese Application No. 2020-048962, 9pp.

* cited by examiner

PERPENDICULAR DIRECTION
OF DISPLAY OF VIRTUAL IMAGE
(DIRECTION OF WIDE APERTURE A2)

FIG. 8

| | SURFACE NUMBER | Y CURVATURE RADIUS (mm) | X CURVATURE RADIUS (mm) | SURFACE SPACING (mm) | MATERIAL | nd |
|---|---|---|---|---|---|---|
| IMAGE DISPLAY ELEMENT (100) | 0 | ∞ | ∞ | 23 | | |
| RELAY OPTICAL SYSTEM (250) | 1 | 9.68 | 9.68 | 3 | SBSM10_OHARA | 1.623 |
| | 2 | -7.65 | -7.65 | 1 | STIH4_OHARA | 1.755 |
| | 3 | -35.21 | -35.21 | 5.2 | | |
| | 4 | -7.34 | -7.34 | 3 | E48R | 1.531 |
| | 5 | -6.22 | -6.22 | 19.3 | | |
| | 6 | -6.09 | -6.09 | 2.5 | E48R | 1.531 |
| | 7 | 8.74 | -9.43 | 1.6 | | |
| | TOROIDAL SURFACE | | | | | |
| | 8 | -39.96 | -39.96 | 5 | SNPH2_OHARA | 1.923 |
| | 9 | 16.73 | 16.73 | 4.6 | SLAM61_OHARA | 1.720 |
| | 10 | -21.79 | -21.79 | 0.3 | | |
| COLLIMATOR OPTICAL SYSTEM (280) | 11 | 14.18 | 14.18 | 3.6 | E48R | 1.531 |
| | 12 | -28.65 | -28.65 | 6.6 | | |
| | 13 | -18.63 | -18.63 | 4.7 | E48R | 1.531 |
| | 14 | -10.68 | -10.68 | 8 | | |
| LIGHT GUIDE MEMBER (300) | 15 | ∞ | ∞ | 40 | E48R | 1.531 |
| | 16 | ∞ | ∞ | 15 | | |
| PUPIL | 17 | ∞ | ∞ | 17.7 | | |
| RETINA | 18 | | | 0 | | |

[X]

[Y]

[X]

[Y]

[X]

[Y]

[X]

[Y]

VIRTUAL IMAGE DISPLAY DEVICE

CROSS-REFERENCE TO RELATED APPLICATIONS

The present application is based on PCT filing PCT/IB2020/052444, filed Mar. 18, 2020, which claims priority to Japanese Patent Application No. 2019-053317, filed Mar. 20, 2019, and Japanese Patent Application No. 2020-018516, filed Feb. 6, 2020, the entire contents of each are incorporated herein by reference.

TECHNICAL FIELD

The present invention relates to a virtual image display device.

BACKGROUND ART

In recent years, head mounted displays (HMDs) are becoming widespread as a virtual image display device. The HMDs are broadly classified into transmissive and non-transmissive types. The transmissive type is used in combination with an information terminal or in combination with augmented reality (AR), and what is called "smart glass" is attracting attention. The non-transmissive type is used widely in games and virtual reality (VR), and is widely loved for the high immersion feeling.

As one genre of the virtual image display device, a virtual image display device that displays, on an image display element, an image to be displayed as a virtual image, propagates an image light from the image display element to a light guide member by a propagation optical system, and guides the propagated image light with the light guide member to emit the image light toward an observer as reflected light and thereby allow an enlarged virtual image to be observed has been known. The above smart glass belongs to such genre and is referred to as a "virtual image display device of the light guide type".

In terms of the virtual image size, the transmissive type desirably has a small size and a good portability because the transmissive type is used in combination with an information terminal or in combination with AR. On the other hand, the non-transmissive type is likely to have a wide viewing angle yielding the immersion feeling because of the use of the non-transmissive type in a game or in VR. HMDs specialized to have a reduced body size or thickness tend to have a narrow viewing angle, while HMDs with a display area of a wide viewing angle tend to have an increased body size or thickness.

Even the transmissive type is required not only to have a reduced thickness but a wide viewing angle. In a known method complying with such requirement, multiple mirrors provided with coatings of specified reflectivities are arranged in a light guide member, and each light beam is allocated to reflection or transmission depending on the angle of incidence of the relevant light beam to effectively extract an image (see Patent Literature 1, for instance).

In another known method, microstructures and gap zones are provided on one side face of a light guide member, and light beams are reflected and propagated by means of such parts to effectively extract an image (see Patent Literature 2, for instance).

In yet another known method, a total reflection part extending in a facing manner and a light guide plate that includes a plurality of first element faces extending in an inclined manner and a plurality of second element faces so extending as to form an obtuse angle with the first element faces, with the first element faces and the second element faces being alternately arranged, are combined together to extract an image (see Patent Literature 3, for instance).

In each of the above methods, position information of an image display element is converted by a collimator optical system into angle information to introduce light into a light guide member. If the collimator optical system is an optical system that is nearly telecentric with respect to the image display element, an optical pupil position of the collimator optical system will be in the vicinity of a light beam incident part of the light guide member. Since the light as introduced into the light guide member is propagated while diverging with respect to the optical axis in the light guide member in a direction corresponding to a vertical visual field of the light guide member, light reflected on a plurality of mirrors or microstructures provided in the light guide member is emitted in a direction going away from an observer's eye, which makes the vertical visual field hardly securable.

For this reason, the collimator optical system is made non-telecentric and the optical pupil position is thus extended to cause light to converge with respect to the optical axis in the light guide member in the direction corresponding to the vertical visual field of the light guide member and emit the light reflected on a plurality of mirrors or microstructures provided in the light guide member in a direction toward the observer's eye. As indicated with an aperture A1 in FIG. 1, however, light needs to pass through a narrow region in the light guide member in a direction corresponding to a horizontal visual field of the light guide member, which leads to a disadvantage of light loss due to "vignetting".

As a method for overcoming such disadvantage, it is described in Patent Literature 4 that light illuminating an image display element is controlled to thereby control the direction of light emitted from the image display element and enhance the light use efficiency. It, however, is difficult to control the direction of light in terms of all pixels in the whole horizontal and vertical directions.

CITATION LIST

Patent Literature

PTL 1

JP-5698297-B

PTL 2

JP-5421285-B

PTL 3

JP-5703875-B

PTL 4

JP-2012-83458-A

SUMMARY OF INVENTION

Technical Problem

An object of the present invention is to provide a virtual image display device of the light guide type that is capable of further enhancing the light use efficiency.

Solution to Problem

Example embodiments include a virtual image display device that includes: an image display element that displays an image to be displayed as a virtual image; a propagation optical system that propagates light from the image display element; and a light guide member that guides the light propagated by the propagation optical system. The light guide member includes: a light beam incident part that introduces light including image information from the propagation optical system into the light guide member; an image extractor that extracts the light including image information from an inside of the light guide member; and an image emitter that emits the light including image information to an outside of the light guide member. The propagation optical system includes one or more optical members each having a curved surface shape that is non-rotationally symmetric with respect to an optical axis.

Example embodiments include a virtual image display device for displaying a virtual image, provided with a virtual image optical system, which includes: an image display element that displays an image to be displayed as a virtual image; a light source that illuminates the image displayed on the image display element; a propagation optical system that propagates light from the image display element; and a light guide member that guides the light propagated by the propagation optical system. The light guide member includes: a light beam incident part that introduces light including image information from the propagation optical system into the light guide member; an image extractor that extracts the light including image information from an inside of the light guide member; and an image emitter that emits the light including image information to an outside of the light guide member. The propagation optical system includes one or more optical members each having a curved surface shape that is non-rotationally symmetric with respect to an optical axis.

Advantageous Effects of Invention

According to one or more embodiments of the present invention, an optical member having a curved surface shape that is non-rotationally symmetric is inserted in the propagation optical system subsequent to the image display element so as to attain a virtual image display device of the light guide type that is capable of further enhancing the light use efficiency.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 8 is a table illustrating exemplary numerical values of a propagation optical system in the embodiment illustrated in FIGS. 6 and 7.

DESCRIPTION OF EMBODIMENTS

Figure 1:
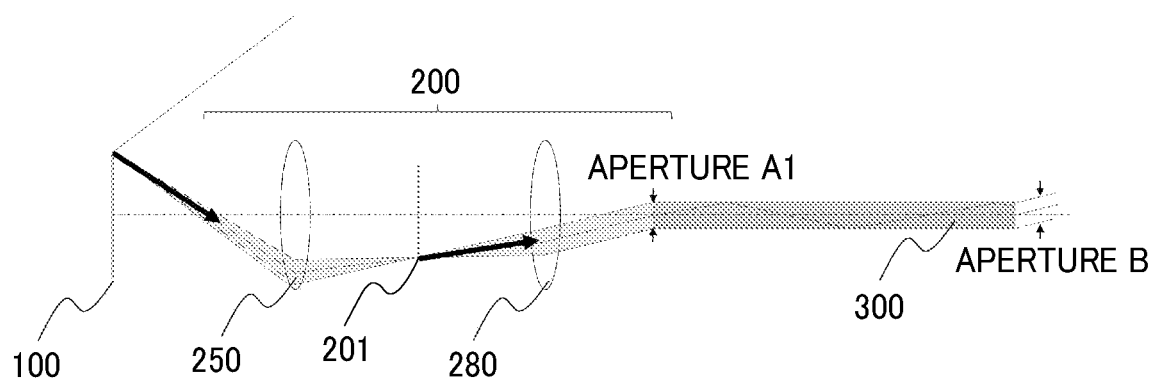
FIG. 1 is a light path diagram as viewed in a plane direction, illustrating a drawback in a basic configuration of a virtual image display device.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As described above, the virtual image display device according to an embodiment of the present invention includes an image display element, a propagation optical system, and a light guide member.

The "image display element" displays an image that is displayed as a virtual image to be observed.

The "propagation optical system" propagates light from the image display element. The "light guide member" guides the light propagated by the propagation optical system. The light propagated by the propagation optical system includes image information of the image displayed on the image display element.

The light guide member includes a "light beam incident part" that introduces the "light including the image information" into the light guide member, an "image extractor" that extracts the "light including the image information," namely, "image light" from an inside of the light guide member, and an "image emitter" that emits the light including the image information to an outside of the light guide member.

The propagation optical system includes one or more "optical members each having a curved surface shape that is non-rotationally symmetric (or rotationally asymmetric) with respect to an optical axis". Hereinafter, an "optical member having a curved surface shape that is non-rotationally symmetric with respect to an optical axis" is also referred to as a "curved surface optical member".

As the image display element, a widely known image display element can be used.

For example, an organic EL display (OLED) having a light-emitting function or a liquid crystal display device or a digital micro color device (DMD) that is non-light-emitting and is illuminated by illumination light can be used, but the image display element is not limited to these, and a microelectromechanical system (MEMS) driven in two dimensions can also be applied as long as an image can be displayed.

The "propagation optical system" that propagates light from the image display element to the light guide member can have various configurations as exemplified below.

The propagation optical system causes nearly parallel light to enter the light beam incident part of the light guide member, for instance. If such a propagation optical system is used, when a plate-shaped member without a power is used as the light guide member, the light emitted from the image emitter forms an image on one point on the "retina of an observer's eye", and thus the observer can see a good virtual image.

The propagation optical system may include a relay optical system that forms an intermediate image of an image displayed on an image display element on the image display element side and a collimator optical system on the light guide member side of the intermediate image, and the one or more "curved surface optical members" may be included in at least one of the relay optical system and the collimator optical system. Even in such configuration, the propagation optical system can cause nearly parallel light to enter the light beam incident part of the light guide member.

In order to secure a high performance and, at the same time, reduce the lens diameter while maintaining a certain magnitude of the whole optical length, it is effective that the propagation optical system forms the intermediate image, and the diameter of the relay optical system can be made relatively small. In addition, a configuration including a relay optical system can respond to the case where the spacing between the image display element and the light guide member needs to be secured for reasons of mechanical or electrical system configuration or the like.

The relay optical system, the curved surface optical members with respect to the optical axis, and the collimator optical system are included in this order from the image display element side and the intermediate image is formed between the relay optical system and the collimator optical system, so that the surfaces of the curved surface optical members are positioned close to the intermediate image. Since the curved surface optical members are located near the intermediate image, it is possible to reduce the spherical aberration or coma aberration caused by the rotational asymmetry.

The propagation optical system having such a configuration is used to convert the light from the image display element into the intermediate image by the relay optical system, and the image display element can be thereby moved away from the vicinity of the front of the observer's head toward the ear, and the weight of the front portion of a smart glass can be thereby reduced, and therefore the wearing comfort of the smart glass can be improved. In addition, the thickness of the end piece of the smart glass can be reduced, and the obstruction of the observer's visual field can be reduced.

The propagation optical system may also include a collimator optical system and one or more optical members each having a curved surface shape that is non-rotationally symmetric with respect to the optical axis on the image display element side of the collimator optical system. The light collimated by the collimator optical system enters the light beam incident part of the light guide member.

The collimator optical system may be "non-telecentric on the image display element side", and when the above-mentioned "relay optical system and collimator optical system" are used, the collimator optical system may be "non-telecentric on the intermediate image side".

In this way, the image display element side of the collimator optical system or the intermediate image side of the collimator optical system can be made non-telecentric. Thus, the distance to the "pupil position of the optical system" becomes long, and light that has propagated inside the light guide member efficiently enters an eye when hitting the image extractor, and it is possible to display a wide-angle virtual image.

In addition, various cases are also possible for the "curved surface optical members" used in the propagation optical system with regard to the disposition position and number in the propagation optical system, as exemplified below.

That is, the curved surface optical members can be disposed "proximately to the intermediate image". The curved surface optical members are disposed adjacent to the image display element, thereby playing a role like a field lens, and the influence on the deterioration in aberration due to the non-rotationally symmetric curved surface shape can be reduced.

When the propagation optical system is to "form an intermediate image", the curved surface optical members can be disposed "proximately to the intermediate image". Even in this manner, the curved surface optical members can play a role like a field lens and reduce the influence on the deterioration in aberration due to the non-rotationally symmetric curved surface shape.

In addition, when the propagation optical system is to "form an intermediate image", a plurality of curved surface optical members can be included in each of the front and the back of the intermediate image. By arranging curved surface optical members in each of the front and the back of the intermediate image, an aberration generated in "respective curved surface shapes which are each rotationally asymmetric" can be reduced.

The "curved surface that is non-rotationally symmetric with respect to an optical axis" of the curved surface optical members can be, for example, a "toroidal surface" or a "cylindrical surface".

The virtual image display device uses the abovementioned curved surface optical members. Since these curved surface optical members each have the "curved surface that is non-rotationally symmetric with respect to an optical axis", the "aspect ratio of an virtual image to be observed" of the image displayed on the image display element is "different from the aspect ratio of the image displayed on the image display element" due to the rotational asymmetry of the abovementioned curved surface shape.

This "difference in the aspect ratios" is determined by the propagation optical system, and thus can be eliminated by inputting a "correction image correcting a difference in an aspect ratio" to the image display element.

It is preferable that the curved surface optical members each have a "positive power in a direction corresponding to the horizontal direction of the virtual image (lateral direction as viewed from the observer)". In this way, when using a plate-shaped light guide member, "the power in the direction corresponding to the horizontal direction of the virtual image is made to be positive", and thus "more light" can be introduced into a thin portion of an incident part. Therefore, light use efficiency can be enhanced, and it is possible to achieve a virtual image display device capable of displaying a bright virtual image.

Moreover, in the virtual image display device, it is preferable that, in the "optical members (curved surface optical members) each having a curved surface shape that is non-rotationally symmetric with respect to the optical axis" of the propagation optical system, a size in a direction corresponding to a perpendicular direction (a direction orthogonal to the aforementioned horizontal direction) of the virtual image is larger than a size in a direction corresponding to the aforementioned horizontal direction. The "size in the direction corresponding to the perpendicular direction of the virtual image" of the curved surface optical members is made to be larger than the "size in the direction corresponding to the horizontal direction of the virtual image". Therefore, light use efficiency can be enhanced, and it is possible to achieve a virtual image display device capable of displaying a bright virtual image.

Furthermore, in the virtual image display device, the virtual image optical system may "include an image display element to display an image to be displayed as a virtual image, a light source to illuminate the image displayed on the image display element, a light guide member, and any of the aforementioned various propagation optical systems that causes image information of the image displayed on the image display element and illuminated by the light source to enter the light guide member".

In the following, more specific description is made on embodiments of the virtual image display device according to an embodiment of the present invention with reference to the drawings. In each embodiment, the virtual image display device according to an embodiment of the present invention is assumed to be "a smart glass using a plate-shaped light guide member". The plate-shaped light guide member is assumed to be any known light guide member "of a plate-shaped type". The light guide member of the plate-shaped type is hereinafter referred to as a "light guide plate".

Figure 2:
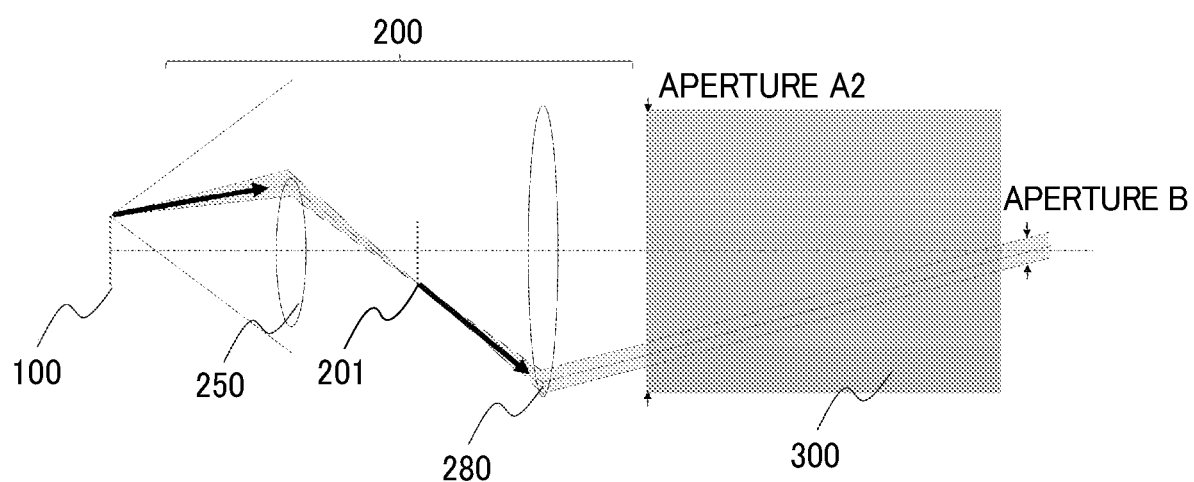
FIG. 2 is a light path diagram as viewed in a front direction, illustrating the drawback in the basic configuration.

FIGS. 1 and 2 illustrate an example in which a propagation optical system 200 of a virtual image display device includes a relay optical system 250 and a collimator optical system 280, which are essentially the same as those described above. In this example, the propagation optical system 200 does not include the "curved surface optical members". Therefore, the propagation optical system 200 is different from any of the propagation optical systems in the embodiments of the virtual image display device according to an embodiment of the present invention. The abovementioned curved surface optical members are added to such a propagation optical system, and one of the propagation optical systems in the embodiments of the present invention is thereby configured.

FIGS. 1 and 2 are conceptual diagrams illustrating a conventional virtual image display device. FIG. 1 is a light path diagram of an image light from an image display element 100 that corresponds to virtual image display in a horizontal direction, and FIG. 2 is a light path diagram of an image light from the image display element 100 that corresponds to virtual image display in a vertical direction. A light beam incident part of a light guide member 300 is "rectangular", and this rectangular light beam incident part is hereinafter referred to as an "aperture". In addition, a pupil of the observer with respect to the "light beam observed as a virtual image", which is emitted from an image emitter of the light guide member 300 and enters the pupil of the observer, is defined as an "aperture B".

In FIG. 1, an aperture A1 on a light beam incident side of the light guide member 300 constitutes the light guide member 300 like an eyeglass lens and represents an aperture in the front-back direction of the eyeglass lens when viewed from the front. The aperture A1 generally has a width of about 2 mm. An aperture A2 on the light beam incident side of the light guide member 300 illustrated in FIG. 2 represents an aperture of the light guide member 300 that corresponds to the vertical direction of the eyeglass lens. The aperture A2 generally has a width of 20 mm or more.

Thus, the aperture A1 in FIG. 1 and the aperture A2 in FIG. 2 are significantly different from each other. If the optical systems are made non-telecentric with respect to the intermediate image and the aperture B on an image emitting side of the light guide member 300 is far positioned before light is caused to enter the light guide member 300, the light does not converge in the vicinity of the light beam incident part of the light guide member 300, so that the light suffers from considerable vignetting at the narrow apertures A1 and A2 on the light beam incident side of the light guide member 300, which leads to a disadvantage of reduction in light use efficiency.

While, moreover, the light from the image display element 100, which is emitted from respective pixels, namely, the image light is generally emitted in an isotropic manner, the relay optical system 250 and the collimator optical system 280 illustrated in FIG. 1 are subject to restrictions on size and are not capable of introducing the whole light from the image display element 100. For this reason, adequate light cannot be introduced as indicated with halftone in the left part of FIG. 1, leading to the reduction in light use efficiency. On the other hand, in the case of the aperture A2 illustrated in FIG. 2, which has a size about ten times as large as the size illustrated in FIG. 1, more light can be introduced as compared with the case illustrated in FIG. 1.

EXAMPLES

Figure 3A:
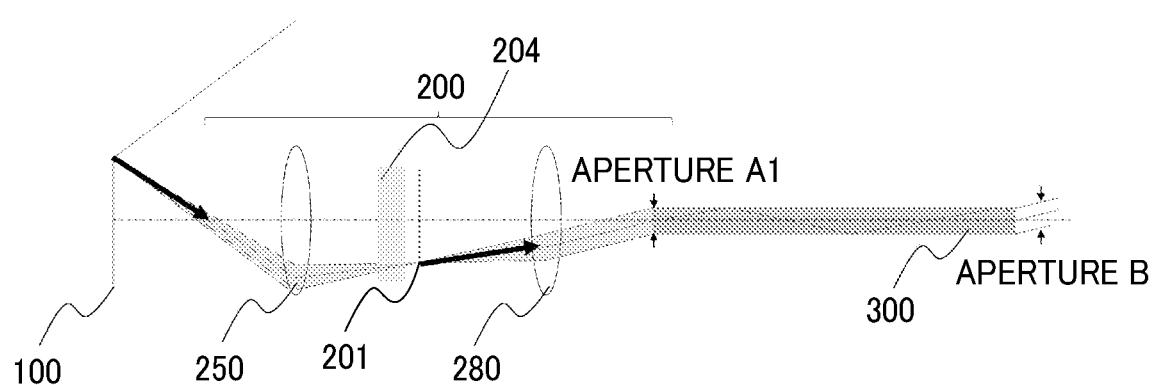
FIG. 3A is a light path diagram as viewed in a plane direction, illustrating an operation of an embodiment of a virtual image display device according to an embodiment of the present invention.
Figure 3B:
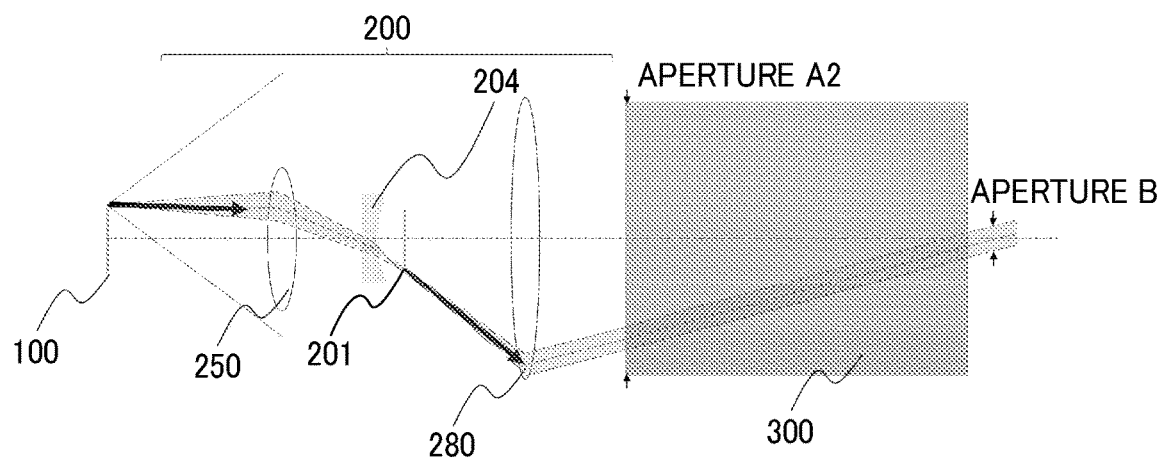
FIG. 3B is a light path diagram as viewed in a front direction, illustrating the operation of the embodiment.

FIGS. 3A and 3B are conceptual diagrams illustrating one embodiment of the present invention, in which embodiment, in contrast to the example illustrated in FIGS. 1 and 2, a lens is arranged in the vicinity of the intermediate image and the lens includes an optical member having a curved surface shape that is rotationally asymmetric. The "optical member having a curved surface shape that is rotationally asymmetric" refers to an optical member that is not axially symmetric with respect to the optical axis, including a cylindrical lens, a toroidal lens, and a free-form surface lens. In the vicinity of an intermediate image 201 in the relay optical system 200, an optical member 204 having a curved surface shape that is non-rotationally symmetric (hereinafter referred to as "curved surface optical member 204") is inserted. By means of the curved surface optical member 204 thus included, the light emitted from an endmost portion of the image display element 100 as illustrated in FIGS. 3A and 3B is changed in direction toward the intermediate image 201 as compared with the example illustrated in FIG. 1, so that the light readily passes through the aperture A1. In addition, the amount of light from the image display element 100, which is required for the pass through of the light to the periphery of the collimator optical system 280, is increased as compared with the example illustrated in FIG. 1, which leads to the enhancement of light use efficiency.

In FIG. 1, the light emitted from the upper end part of the image display element 100 enters the relay optical system (hereinafter referred to as "relay lens") 250 of the propagation optical system 200 while diverging, and forms an intermediate image 201 by the action of the relay lens 250, and then is converted into a parallel light beam by the collimator optical system (hereinafter referred to as "collimator lens") 280 and enters the aperture A1.

Normally, light from each pixel of the image display element 100 is isotropically radiated, as illustrated with dashed lines extending fanwise from the upper end part of the image display element 100 in FIG. 1. In the example illustrated in FIG. 1, however, due to the restrictions on the size of the relay lens 250 and the collimator lens 280, it is not possible to "introduce the whole" of the light isotropically radiated from the image display element 100 with such lenses.

Of the luminous flux indicated by the dashed lines, that is isotropically radiated from the upper end part of the image display element 100 illustrated in FIG. 1, only a portion indicated with halftone on the left side of the relay lens 250 is introduced into the propagation optical system 200 and passes through the apertures A1 and B, thereby causing a reduction in light use efficiency.

FIG. 2 corresponds to "the vertical direction of an eyeglass lens when viewed from the front" when the light guide plate is used like the eyeglass lens.

As can be seen by comparing FIGS. 1 and 2, when the range of light emitted from the image display element 100 is limited by the apertures A1, A2, and B, the direction of the light propagating from the image display element 100 to the relay optical system 250 and the collimator optical system 280 is different between the back of the image display element 100 and the back of the intermediate image 201, as indicated with halftone. Therefore, the light in each different area of the light within the dashed lines, which is normally isotropically radiated from the upper end part of the image display element 100, is used, and it is required to emit light from the image display element 100 at a large angle so as to include the light in each area, which leads to a disadvantage of the reduction in light use efficiency.

FIGS. 3A and 3B are diagrams illustrating an operation of an embodiment of the virtual image display device according to the present invention. In order to avoid complications, components that are not likely to be confusing are denoted by the same reference signs.

In FIGS. 3A and 3B, the propagation optical system 200 includes the curved surface optical member 204 in addition to the relay lens 250 and the collimator lens 280.

As illustrated in the figures, the curved surface optical member 204 having a "curved surface shape that is non-rotationally symmetric with respect to an optical axis direction" is inserted near the intermediate image 201 of the relay lens 250, and the direction of the light exiting from the uppermost end part of the image display element 100 toward the intermediate image 201 can be thereby changed independently in each cross section of FIGS. 1 and 2. Consequently, the direction of the light exiting from the upper end part of the image display element 100 can be made closer to the same direction in each cross section in FIGS. 1 and 2, and it is possible to decrease the reduction in light use efficiency, which has been caused by using the light in each different area of the light within the dashed lines, that is isotropically radiated from the upper end part of the image display element 100 in FIGS. 1 and 2.

Embodiment of Virtual Image Display Device

Hereinafter, description is made on embodiments of the inventive virtual image display device.

As described above, each embodiment of the virtual image display device according the present invention basically includes the image display element, propagation optical system, and light guide member. The light guide member includes the light beam incident part that introduces light including image information from the propagation optical system into the light guide member, the image extractor that extracts the light including the image information from the inside of the light guide member, and the image emitter that emits the light including the image information to the outside of the light guide member. The propagation optical system includes one or more optical members each having a curved surface shape that is non-rotationally symmetric with respect to an optical axis.

That is, the above-described "forming of the intermediate image" is not necessarily required.

Figure 4:
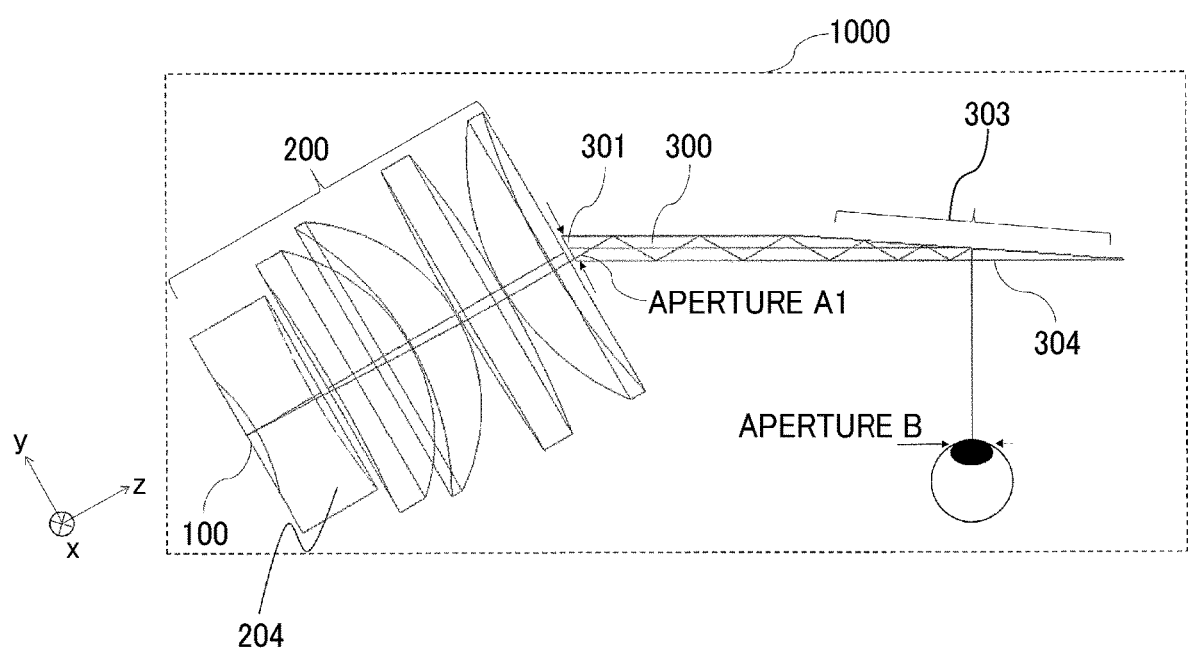
FIG. 4 is a light path diagram as viewed in a plane direction, illustrating one embodiment of the virtual image display device according to an embodiment of the present invention.
Figure 5:
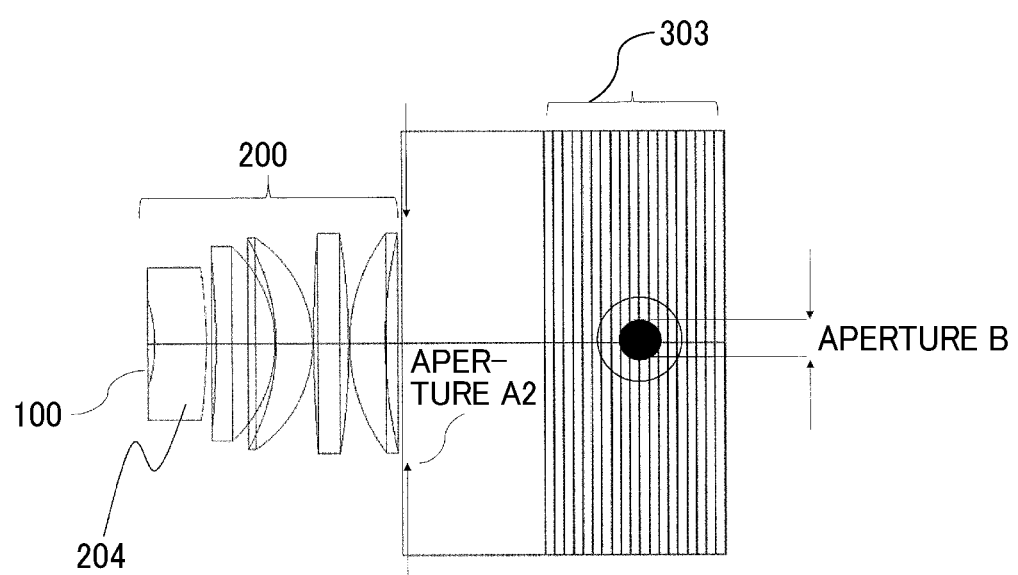
FIG. 5 is a light path diagram illustrating the one embodiment as viewed in a front direction.

The embodiment illustrated in FIGS. 4 and 5 is an example of a mode in which the intermediate image is not formed.

In FIG. 4, the narrow side (aperture A1) of the aperture of a light beam incident part 301 in a light guide plate 300 that is a plate-shaped light guide member is in the vertical direction in the drawing, and in FIG. 5, the wide side (aperture A2) of the aperture of the light beam incident part 301 is in the vertical direction in the drawing.

As illustrated in FIGS. 4 and 5, a virtual image display device 1000 converts the light from the image display element 100 into nearly parallel light by the propagation optical system 200, and causes the light to enter the light guide plate 300 and then the pupil (aperture B) of an observer.

The propagation optical system 200 includes the curved surface optical member 204 having a curved surface shape that is non-rotationally symmetric with respect to an optical axis direction. The curved surface optical member 204 is disposed "proximately to the image display element 100", and plays a role like a field lens and reduces the influence on the deterioration in aberration due to the curved surface shape that is rotationally asymmetric.

The light guide plate 300 that is a plate-shaped light guide member includes the light beam incident part 301 for acquiring image information from the propagation optical system 200, an image extractor 303 including "a plurality of surfaces having an angle of Θ (theta)", and an image emitter 304.

The light propagated by the propagation optical system 200 enters from the light beam incident part 301 and is guided inside the light guide plate 300.

The light including image information is converted by the propagation optical system 200 including the "collimator optical system" in such a manner that the position information of the image display element 100 is converted into angle information, and the angle information enters the light guide plate 300.

FIGS. 4 and 5 illustrate the optical path of information at the center of the image display element 100. In FIGS. 4 and 5, the light including image information enters from the light beam incident part 301 of the light guide plate 300 through the propagation optical system 200, is guided inside the light guide plate 300, is reflected by the image extractor 303 having an angle of a wedge-shaped portion of Θ(theta), and is emitted from the image emitter 304 as light having image information. The virtual image can be confirmed by looking through the image emitter 304.

Here, the image extractor 303 will be described.

Figure 9:
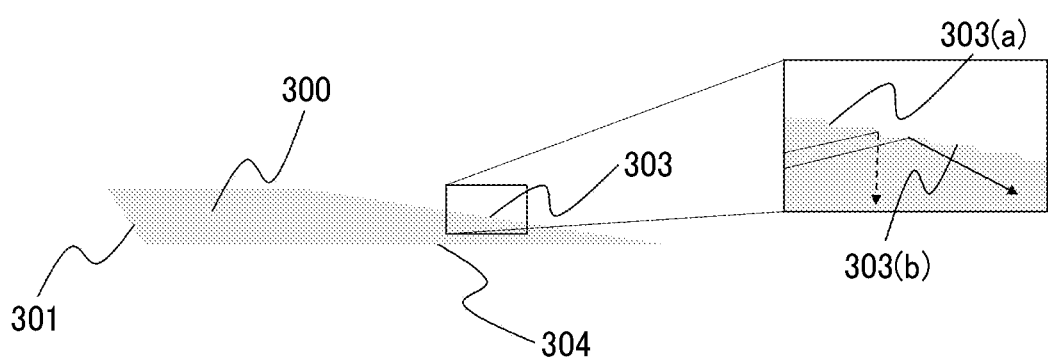
FIG. 9 is a diagram illustrating an image extractor of a light guide member.
Figure 10:
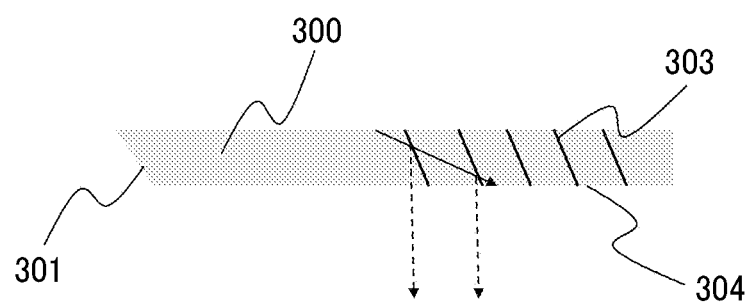
FIG. 10 is a diagram illustrating another exemplary image extractor of the light guide member.

In FIG. 9, a plurality of image extractors 303 are disposed on the side surface of the light guide plate 300, and in FIG. 10, a plurality of image extractors 303 are disposed inside the light guide plate 300. In the case of FIG. 9, the image extractors 303 include a slope portion 303(a) and a flat portion 303(b), and light hitting the slope portion 303(a) is emitted from the image emitter 304, and light not hitting the slope portion 303(a) propagates inside the light guide plate 300 through the flat portion 303(b) until hitting the next slope portion 303(a), and is emitted from the image emitter 304 after hitting the slope portion 303(a).

In order to enhance light use efficiency, it is preferable that the slope portion 303(a) is provided with a reflective coating of aluminum or the like. In this way, light can be applied to the plurality of slope sections 303(a), thereby extending an eyebox.

In the example of FIG. 10, the image extractor 303 is provided with a coating having reflection and transmission properties. The light propagating inside the light guide plate 300 branches off for reflection and transmission at the image extractor 303, the reflected light is emitted from the image emitter 304, the transmitted light branches off for reflection and transmission at the next image extractor 303, and the reflected light is emitted from the image emitter 304. In this manner, the eyebox can be enlarged.

Figure 6:
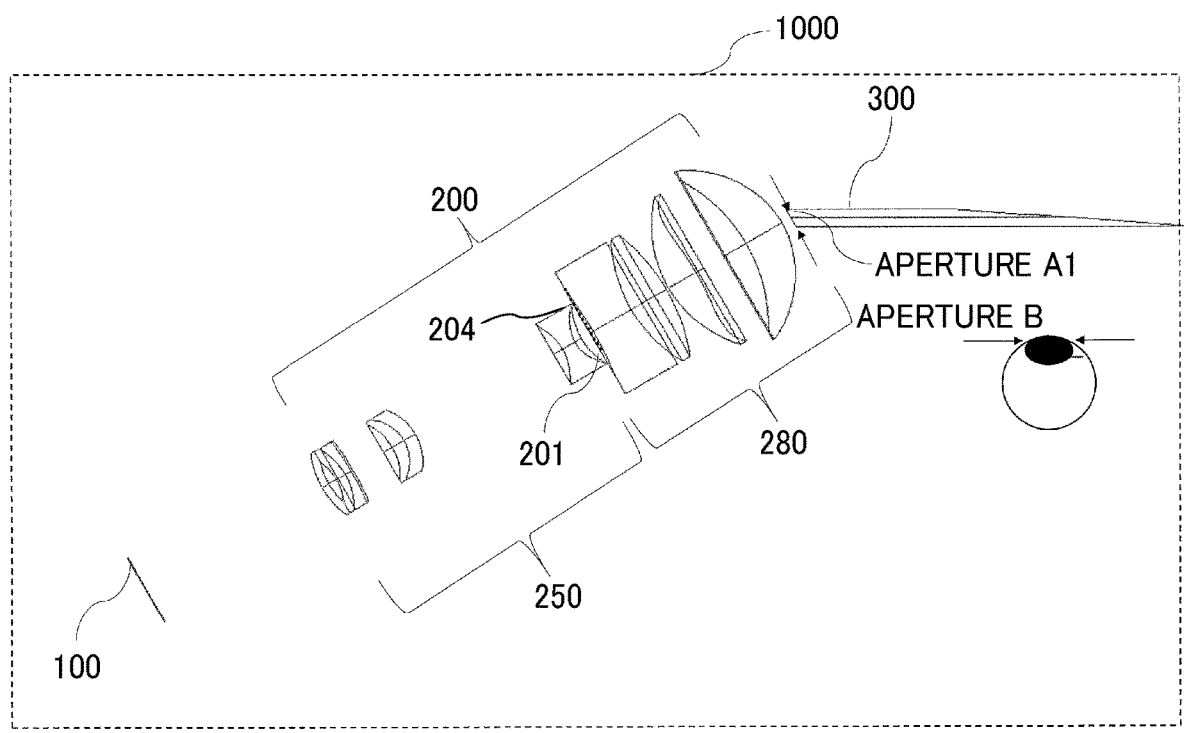
FIG. 6 is a light path diagram as viewed in a plane direction, illustrating another embodiment of the virtual image display device according to an embodiment of the present invention.
Figure 7:
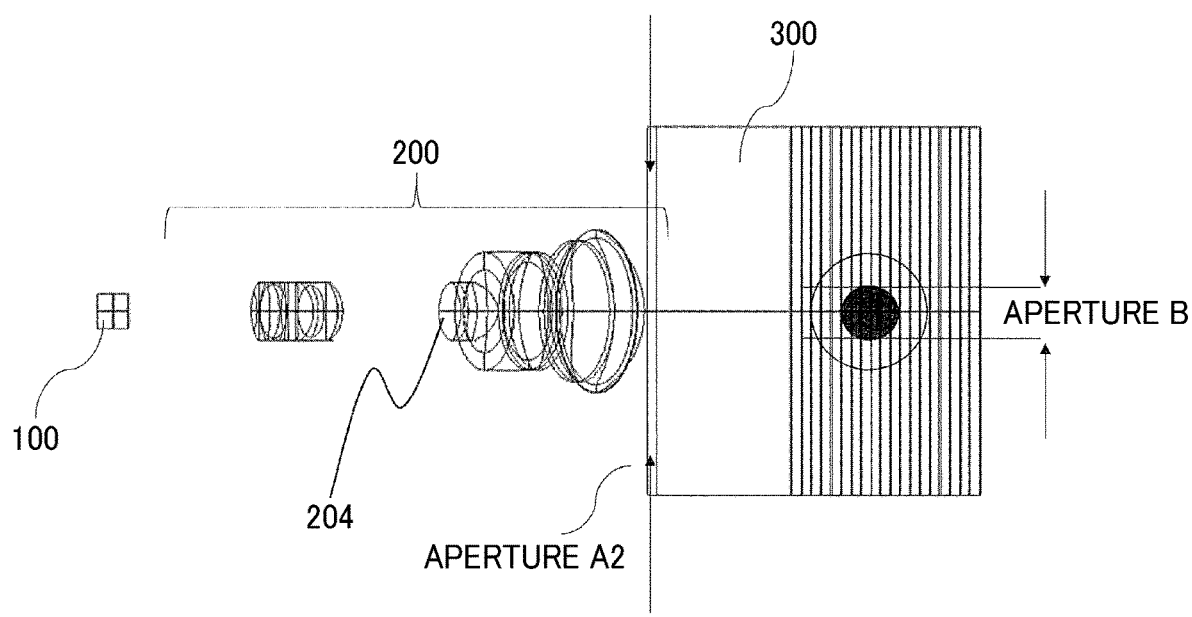
FIG. 7 is a light path diagram illustrating the embodiment illustrated in FIG. 6 as viewed in a front direction.

FIGS. 6 and 7 illustrate another embodiment of the virtual image display device 1000. In this embodiment, the relay lens 250 is disposed in the propagation optical system 200, and the light from the image display element 100 is once caused to form the intermediate image 201. The curved surface optical member 204 having a curved surface shape that is non-rotationally symmetric with respect to the optical axis is disposed close to the front of the intermediate image 201.

The light that has formed the intermediate image 201 enters the light beam incident part 301 of the light guide plate 300 through the collimator lens 280, and is guided inside the light guide plate 300 as is the case with FIGS. 4 and 5, and is emitted from the image emitter 304 toward the pupil of an observer.

In the following, a specific example of the embodiment illustrated in FIGS. 6 and 7 is described.

FIG. 8 illustrates data (a surface number, a curvature radius, a surface spacing, a material, a refractive index) reaching from the image display element 100 to the pupil and retina of the observer through the propagation optical system 200 and the light guide plate 300.

The propagation optical system 200 includes the relay optical system 250 and the collimator optical system 280, and the curved surface optical member 204 is provided in the relay optical system 250.

The relay lens 250 includes three lenses and a curved surface optical member arranged in order from the image display element 100 side. The curved surface optical member 204 includes a toroidal surface (surface number 7) on the image side. Two lenses on the image display element 100 side of the collimator lens 280 constitute a cemented lens.

The data of the light guide member (light guide plate) 300 is as follows.

Smallest thickness: 0.5 mm
Length: 44 mm
Width: 50 mm
Incident part: 2.3 mm×50 mm
Θ(theta)=30 degrees
Refractive index (Nd)=1.53 (material: plastic)
Viewing angle: 50 degrees
Eyebox: 5 mm or more
Eyerelief: 15 mm or more The "eyebox" is a width of a visual field that can be confirmed as a virtual image, and the "eyerelief" is a distance from the image emitter 304 to an eyeball (pupil: aperture B), where the virtual image can be confirmed.

The content described with reference to FIGS. 1 through 7 is also valid if the drawings are reversed right and left. In addition, it is possible to configure in such a manner that "one light guide member is confirmed with both eyes". It is also possible that one light guide member is divided into two and confirmed with each eye, and the light guide member can be made smaller and a monocular system is also possible.

When trying to achieve a wide-angle smart glass, the virtual image becomes a large screen, and the brightness of the virtual image tends to be dark. Light contributing to the display of the virtual image in the horizontal direction must enter in a direction toward a thin part of a light guide member, which leads to a disadvantage of the reduction in light use efficiency caused by the "vignetting" of light at the light beam incident part of the light guide member. In each embodiment of the virtual image display device according to the present invention, however, the optical member having a curved surface shape that is non-rotationally symmetric with respect to an optical axis direction is disposed in the optical system, and thus the direction of light can be controlled for directions toward thick and thin parts of the light guide member with respect to the light isotropically emitted from the image display element. Therefore, it is possible to control the direction of light that enters the thin part of the light guide member without excessively increasing the divergence angle of the light from the image display element, and thus "enhance light use efficiency".

In order to further enhance the light use efficiency and, at the same time, further reduce the diameter of the propagation optical system including the curved surface optical member 204, it is desirable that the following conditional expression is satisfied.

$$0.1 < TLA/TL < 0.5$$

In the expression, TLA represents the distance from a surface of a curved surface shape that is non-rotationally symmetric with respect to the optical axis to a surface of the collimator lens 280 that is closest to the light guide member 300. TL represents the distance from a surface on the image display element 100 side of the relay lens 250 to a surface of the collimator lens 280 that is closest to the light guide member 300. The distances are of values determined on the optical axis.

If the value of TLA/TL is 0.5 or more, the surface of a curved surface shape that is non-rotationally symmetric is too far from the light guide member 300, and the diameters of the curved surface optical member 204 having a curved surface shape that is non-rotationally symmetric and the collimator lens 280 are too large. If the value of TLA/TL is 0.1 or less, the surface of a curved surface shape that is non-rotationally symmetric is too close to the light guide member 300 and, accordingly, achieves a less effect, so that the incident range of the light guide member 300 is made too wide.

In order to further enhance the light use efficiency and, at the same time, further reduce the diameter of the propagation optical system including the curved surface optical member 204, it is desirable that the following conditional expression is satisfied.

$$0.3 < TLC/TLR < 0.6$$

In the expression, TLC represents the thickness of the collimator lens 280 and TLR represents the thickness of the relay lens 250. The thicknesses are each of a value determined on the optical axis.

If the value of TLC/TLR is 0.6 or more, the collimator lens 280 is thick, and the diameters of the curved surface optical member 204 having a curved surface shape that is non-rotationally symmetric and the collimator lens 280 are too large. If the value of TLC/TLR is 0.3 or less, the collimator lens 280 is too thin, so that various aberrations are hard to correct in the collimator lens 280.

In order to improve the performance of the propagation optical system, it is desirable that the following conditional expression is satisfied.

$$-0.5 < Pos1/Y < 0.5$$

In the expression, Y represents the size in a diagonal direction of the image display element 100. Pos1 represents the position of a surface of a curved surface shape that is non-rotationally symmetric when the position of the intermediate image 201 is taken as a reference. Pos1 is of a negative value if the surface of a curved surface shape that is non-rotationally symmetric is located in a position closer to the image display element 100 than the position of the intermediate image 201. The positions are of values determined on the optical axis.

If the value of Pos1/Y is 0.5 or more or −0.5 or less, the distance between the surface of a curved surface shape that is non-rotationally symmetric and the intermediate image 201 is increased and it is difficult to prevent the generation of a non-rotationally symmetric spherical aberration or coma aberration.

In order to further reduce the size of the propagation optical system, it is desirable that the following conditional expression is satisfied.

$$-3.0 < \beta\_relay < -1.0$$

In the expression, β_relay represents the lateral magnification of the relay lens 250.

If a display part of the image display element 100 is made larger, electric parts including a printed circuit board (PCB) and other parts become larger correspondingly, so that the reduction in size is difficult. It, however, is necessary for an enlarged field angle being attained that the intermediate image is relatively large, so that it is desirable that the lateral magnification of the relay lens 250 satisfies the above conditional expression.

In order to improve the performance of the propagation optical system, it is desirable that the following conditional expression is satisfied.

$$-0.5 < f\_p\ max/f\_p\ min < 0.5$$

In the expression, f_pmax represents the focal length in a cross section with the strongest positive power of the curved surface optical member 204, and f_pmin represents the focal length in a cross section with the weakest positive power of the curved surface optical member 204.

If the value of f_pmax/f_pmin is 0.5 or more, the focal length is positive or negative in both the cross sections and the difference in focal length between the cross sections is little, so that the arrangement of a surface that is non-rotationally symmetric is less effective and the reduction in size of the light guide member 300 and the collimator lens 280 is difficult. If the value of f_pmax/f_pmin is −0.5 or less, the positive power of the cross section with the strongest positive power is rather weak, so that the reduction in size of the light guide member 300 and the collimator lens 280 is difficult.

In order to improve the performance of the propagation optical system, it is desirable that the following conditional expression is satisfied.

$$-0.5 < f\_y/f\_x < 0.5$$

In the expression, f_y represents the focal length of the curved surface optical member 204 in a cross section in a long side direction of the image display element 100, and f_x represents the focal length of the curved surface optical member 204 in a cross section in a short side direction of the image display element 100.

If the value of f_y/f_x is 0.5 or more, the focal length is positive or negative in both the cross sections and the difference in focal length between the cross sections is little, so that the arrangement of a surface that is non-rotationally symmetric is less effective and the reduction in size of the light guide member 300 and the collimator lens 280 is not possible. If the value of f_y/f_x is −0.5 or less, the positive power in the long side direction is weak, so that the reduction in size of the light guide member 300 and the collimator lens 280 is not possible.

In order to improve the performance of the propagation optical system while securing the whole length of the propagation optical system, it is desirable that the intermediate image 201 is arranged between the relay lens 250 and the collimator lens 280. It is desirable, moreover, that the relay lens 250 includes a relay front group and a relay rear group in order from the image display element 100 side, and the spacing between the relay front group and the relay rear group is larger than any of the spacings between other optical members in the relay lens 250.

By securing an appropriate spacing between the relay front group and the relay rear group, it is possible to correct various aberrations while securing the whole length of the propagation optical system.

In order to improve the performance of the propagation optical system, it is desirable that the following conditional expression is satisfied.

$$0.4 < TLRa/TLR < 0.7$$

In the expression, TLR represents the thickness of the relay lens 250 and TLRa represents the spacing between the relay front group and the relay rear group. The thickness and the spacing are of values determined on the optical axis.

If the value of TLRa/TLR is 0.7 or more, the spacing between the relay front group and the relay rear group is too large and a space formed by the relay front group or the relay rear group is too small, so that various aberrations are hard to correct. If the value of TLRa/TLR is 0.4 or less, the spacing between the relay front group and the relay rear group is too small and it is difficult to correct various aberrations in the relay lens 250 while securing the whole length of the propagation optical system 200.

In order to improve the performance of the propagation optical system, it is desirable that the following conditional expression is satisfied.

$$0.4 < f\_r/f\_rf < 0.8$$

In the expression, f_r represents the focal length of a relay group and f_rf represents the focal length of the relay front group.

The relay front group chiefly has an image forming function in the relay optical system 250, and it is important to achieve an appropriate power arrangement. If the value of f_r/f_rf is 0.8 or more, the focal length of the relay front group is too short and an aberration generated in the relay front group is not corrected adequately, so that it is difficult to correct various aberrations in the entire propagation optical system 200. If the value of f_r/f_rf is 0.4 or less, the focal length of the relay front group is too long and the correction of aberrations in the relay lens 250 is difficult.

Numerical Value Examples of Virtual Image Display Device

In the following, specific numerical value examples of embodiments of the virtual image display device according to the present invention are presented. In each of the following examples, the size of the image display element 100 is 2.97 mm in the vertical (X) direction, 5.28 mm in the horizontal (Y) direction, and 6.06 mm in the diagonal direction. In each of the numerical value examples, the first to thirteenth surfaces constitute the relay optical system 250, and the fourteenth and fifteenth surfaces constitute the curved surface optical member 204 having a curved surface shape that is non-rotationally symmetric with respect to the optical axis. The sixteenth to twenty-first surfaces constitute the collimator lens 280, the twenty-second and twenty-third surfaces as parallel flat surfaces constitute the light guide member 300, and the distance to the twenty-third surface is the eyerelief.

Schematic optical arrangements of the respective numerical value examples are illustrated in FIGS. 11, 13, 15, and 17. Aberration diagrams of the respective numerical value examples are illustrated in FIGS. 12, 14, 16, and 18. FIG. 19 illustrates measurement points of aberrations. As illustrated in FIG. 19, there are three measurement points (a), (b), and (c) in the lateral direction and three measurement points 1, 2, and 3 in the vertical direction. Each aberration diagram illustrates the result of measurement performed at the three measurement points 1, 2, and 3 for each of the three measurement points (a), (b), and (c) in the X and Y directions.

Numerical Value Example 2

Figure 11:
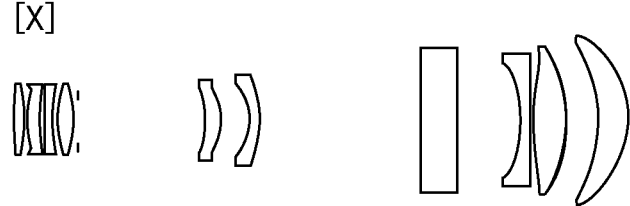
FIG. 11 is an optical arrangement diagram of Numerical Value Example 2 of the virtual image display device according to an embodiment of the present invention.
Figure 11:
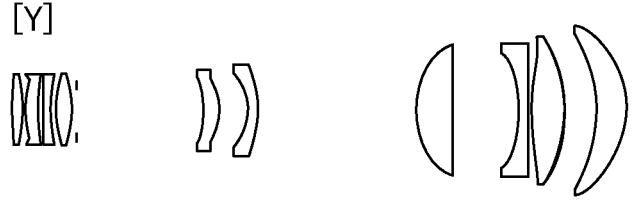
Figure 12A:
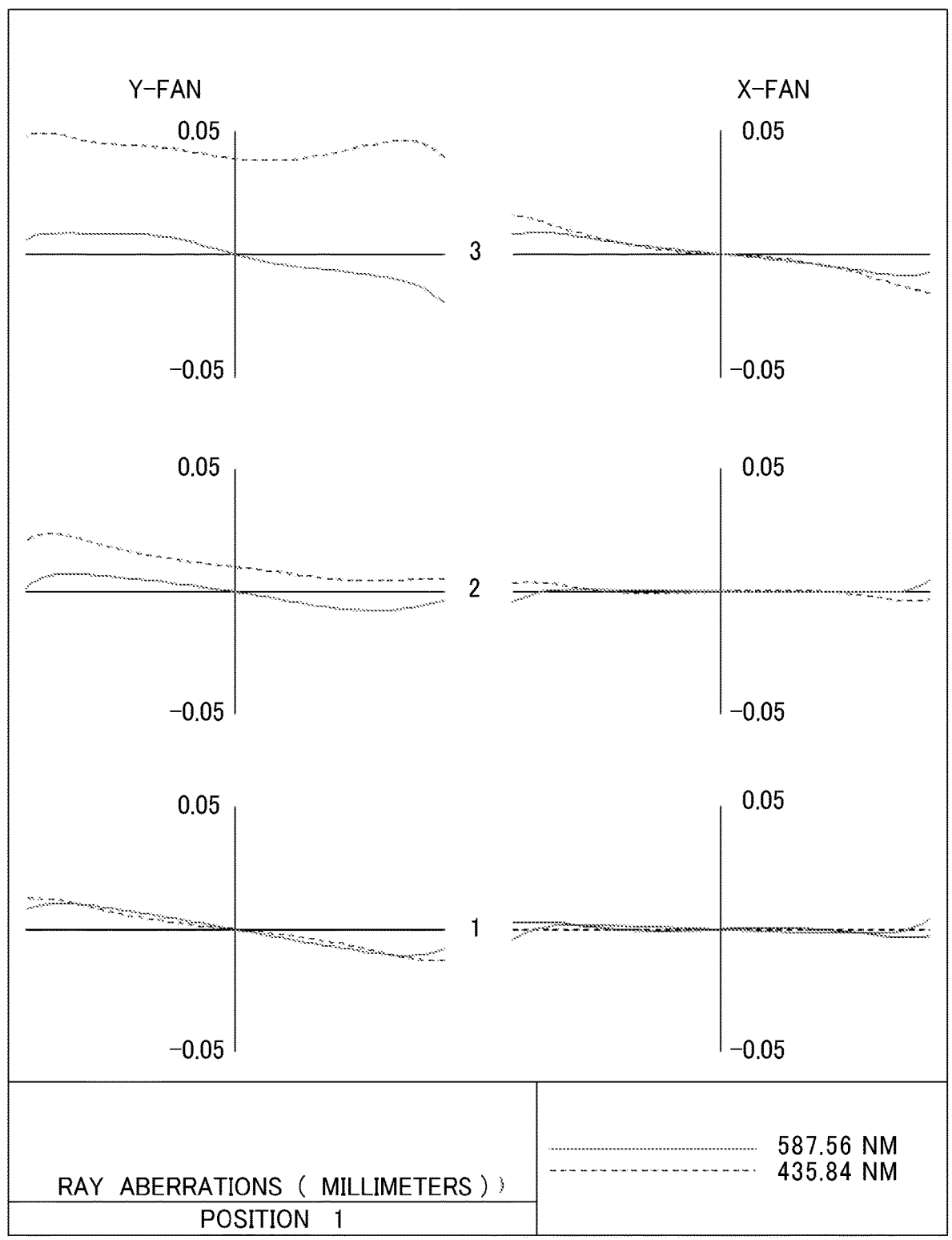
FIGS. 12A, 12B, and 12C are a diagram illustrating lateral aberration curves of Numerical Value Example 2.
Figure 12B:
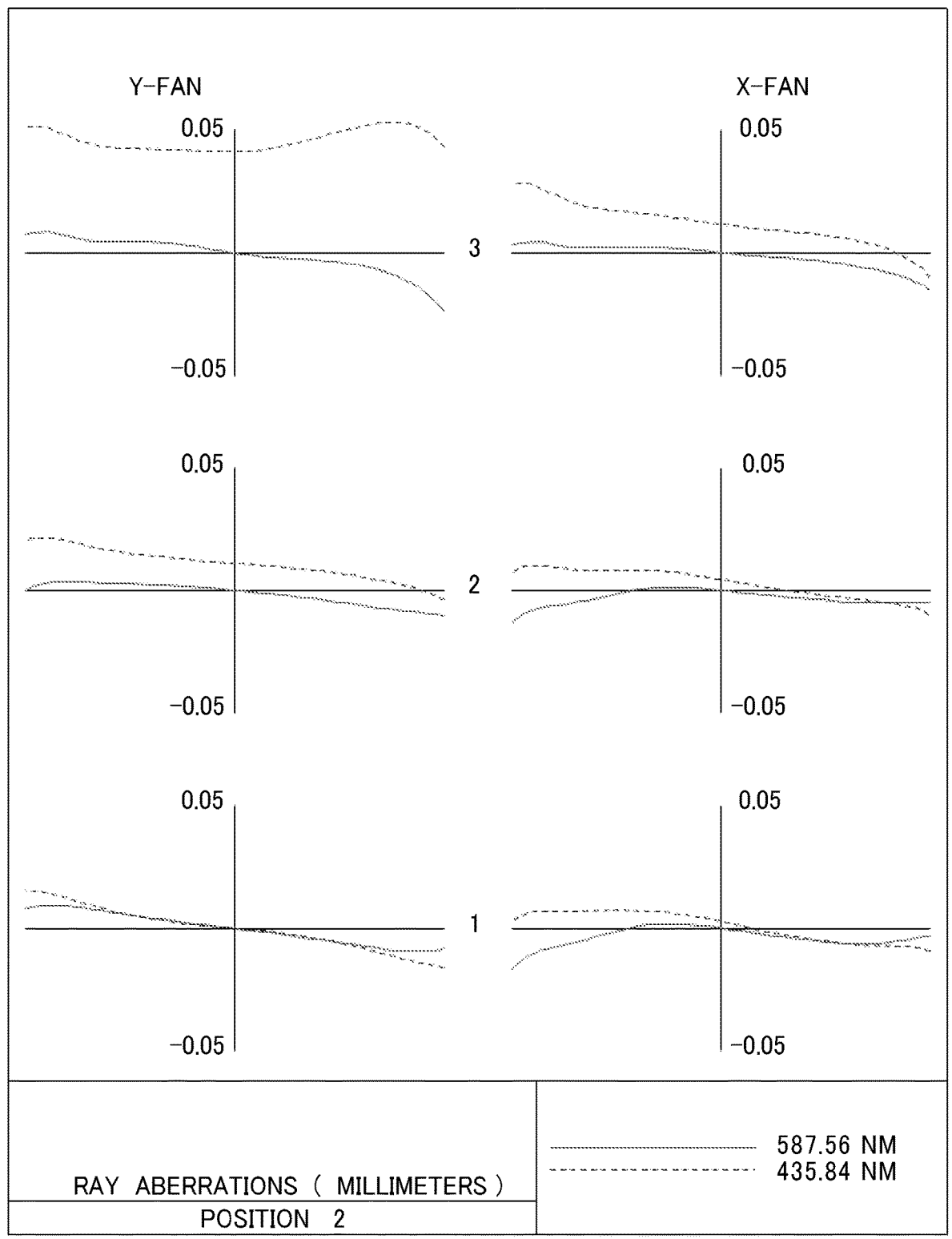
Figure 12C:
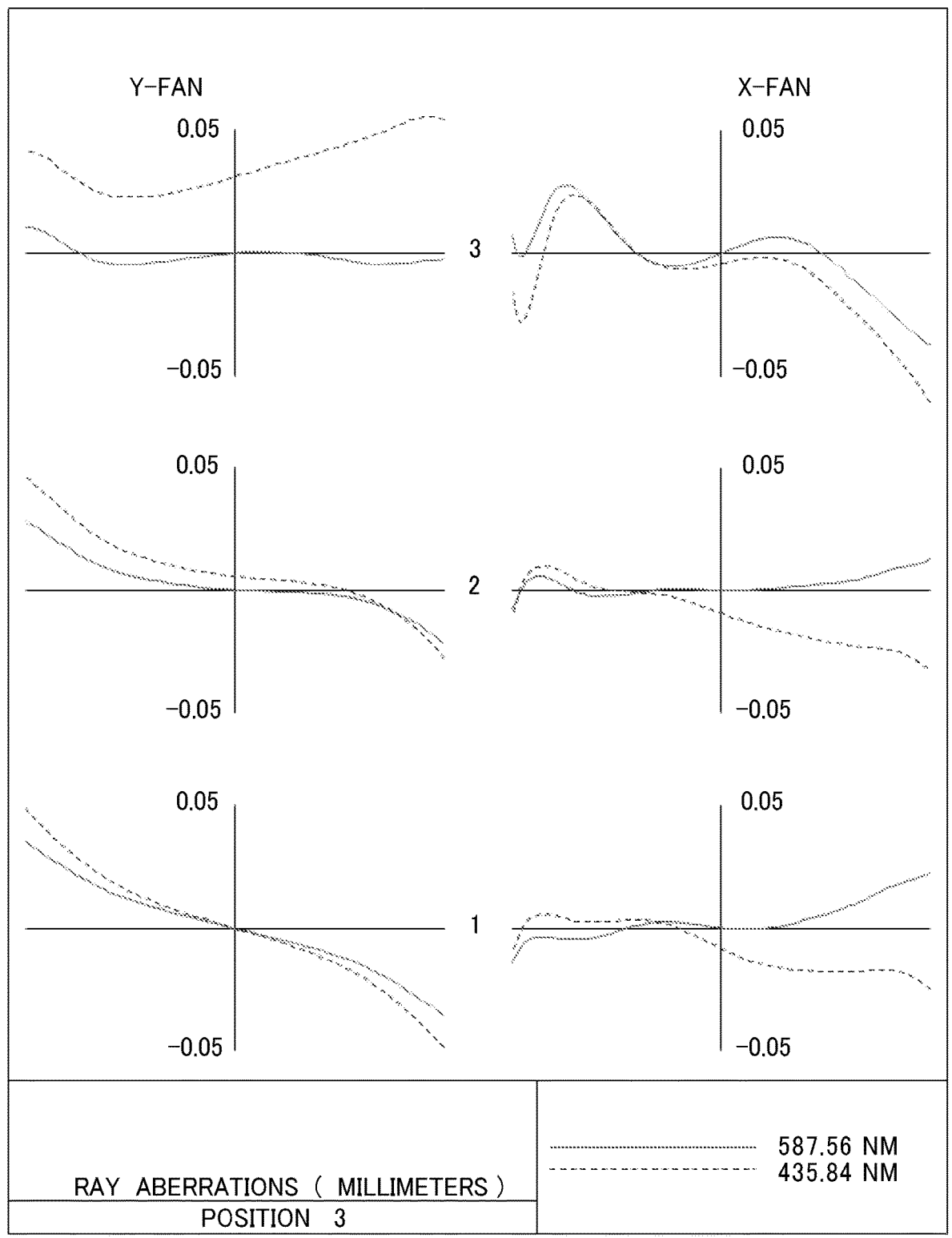

FIG. 11 illustrates an optical arrangement of Numerical Value Example 2 and FIG. 12 is an aberration diagram of the optical arrangement.

Field angle: vertical (X), 17.4 degrees; horizontal (Y), 38.3 degrees; diagonal, 40.9 degrees.
Virtual Image Distance: 0.6 m.

| | Rx | Ry | D | Nd | νd | |
|---|---|---|---|---|---|---|
| 0 | | | 15.94 | | | |
| 1 | 62.094 | 62.094 | 1.50 | 1.72000 | 50.23 | S-LAT10(OHARA) |
| 2 | −19.245 | −19.245 | 0.22 | | | |
| 3* | 9.042 | 9.042 | 1.34 | 1.53100 | 56 | E48R(ZEON) |
| 4* | 12.162 | 12.162 | 0.80 | | | |
| 5 | −21.863 | −21.863 | 0.90 | 1.78472 | 25.68 | S-TH11(OHARA) |
| 6 | 15.824 | 15.824 | 0.55 | | | |
| 7* | 8.590 | 8.590 | 2.03 | 1.53100 | 56 | E48R(ZEON) |
| 8* | −14.280 | −14.280 | 0.47 | | | |
| 9 | Diaphragm (aperture diameter: 5.4) | | 15.34 | | | |
| 10 | −13.468 | −13.468 | 1.74 | 1.53100 | 56 | E48R(ZEON) |
| 11* | −5.347 | −5.347 | 3.54 | | | |
| 12* | −5.603 | −5.603 | 1.25 | 1.53100 | 56 | E48R(ZEON) |
| 13* | −175.288 | −175.288 | 19.45 | | | |
| 14 | ∞ | 9.266 | 4.30 | 1.60100 | 56 | E48R(ZEON) |
| 15 | ∞ | ∞ | 7.77 | | | |
| 16* | −13.415 | −13.415 | 0.90 | 1.63200 | 23 | OKP4HT(Osaka Gas Chemicals) |
| 17 | 1162.878 | 1162.878 | 0.42 | | | |
| 18* | 20.837 | 20.837 | 4.00 | 1.53100 | 56 | E48R(ZEON) |
| 19 | −15.491 | −15.491 | 3.90 | | | |
| 20 | −16.692 | −16.692 | 3.53 | 1.53100 | 56 | E48R(ZEON) |
| 21* | −9.934 | −9.934 | 1.30 | | | |
| 22 | ∞ | ∞ | 42.69 | 1.53100 | 56 | E48R(ZEON) |
| 23 | ∞ | ∞ | 15.00 | | | |

Aspherical Coefficient

| | K | A4 | A6 | A8 | A10 |
|---|---|---|---|---|---|
| 3 | 0.000 | −1.86404E−03 | 1.42016E−04 | −1.16227E−05 | 4.27844E−08 |
| 4 | 0.000 | −2.92352E−03 | 3.78372E−04 | −2.75538E−05 | 4.13654E−07 |
| 7 | 0.000 | −1.83980E−03 | 1.56088E−04 | −5.27314E−06 | 6.10456E−08 |
| 8 | −25.182 | −1.85868E−03 | 6.42986E−05 | 0.00000E+00 | 0.00000E+00 |
| 11 | 0.000 | 2.55256E−03 | 1.42898E−05 | −8.57411E−07 | 1.51822E−07 |

-continued

| | K | A4 | A6 | A8 | A10 |
|---|---|---|---|---|---|
| 12 | 0.000 | 7.49146E−04 | 1.14044E−05 | 2.28411E−06 | 1.63091E−09 |
| 13 | 0.000 | −3.62920E−03 | 1.56426E−04 | −4.68515E−06 | 7.57761E−08 |
| 16 | 0.000 | −2.17160E−04 | 3.92759E−07 | 8.32430E−09 | −1.00005E−10 |
| 18 | 0.000 | −5.18021E−07 | −5.89067E−06 | 1.07591E−07 | −8.91752E−10 |
| 21 | −0.170 | 3.25687E−05 | −3.54680E−08 | 7.37095E−09 | −6.15931E−11 |

Conditional Expression

| | |
|---|---|
| TLA/TL | 0.28 |
| TLC/TLR | 0.43 |
| Pos1/Y | −0.36 |
| β_relay | −2.52 |
| f_pmax/f_pmin | 0.00 |
| f_y/f_x | 0.00 |
| TLRa/TLR | 0.54 |
| f_r/f_rf | 0.75 |

Numerical Value Example 3

Figure 13:
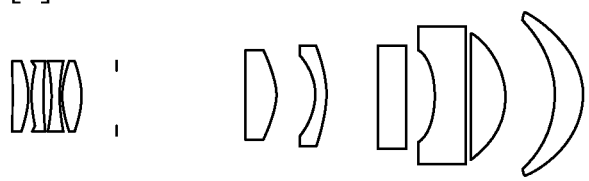
FIG. 13 is an optical arrangement diagram of Numerical Value Example 3 of the virtual image display device according to an embodiment of the present invention.
Figure 13:
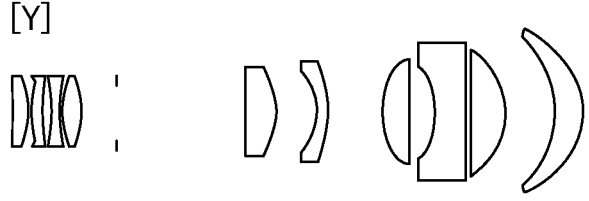
Figure 14A:
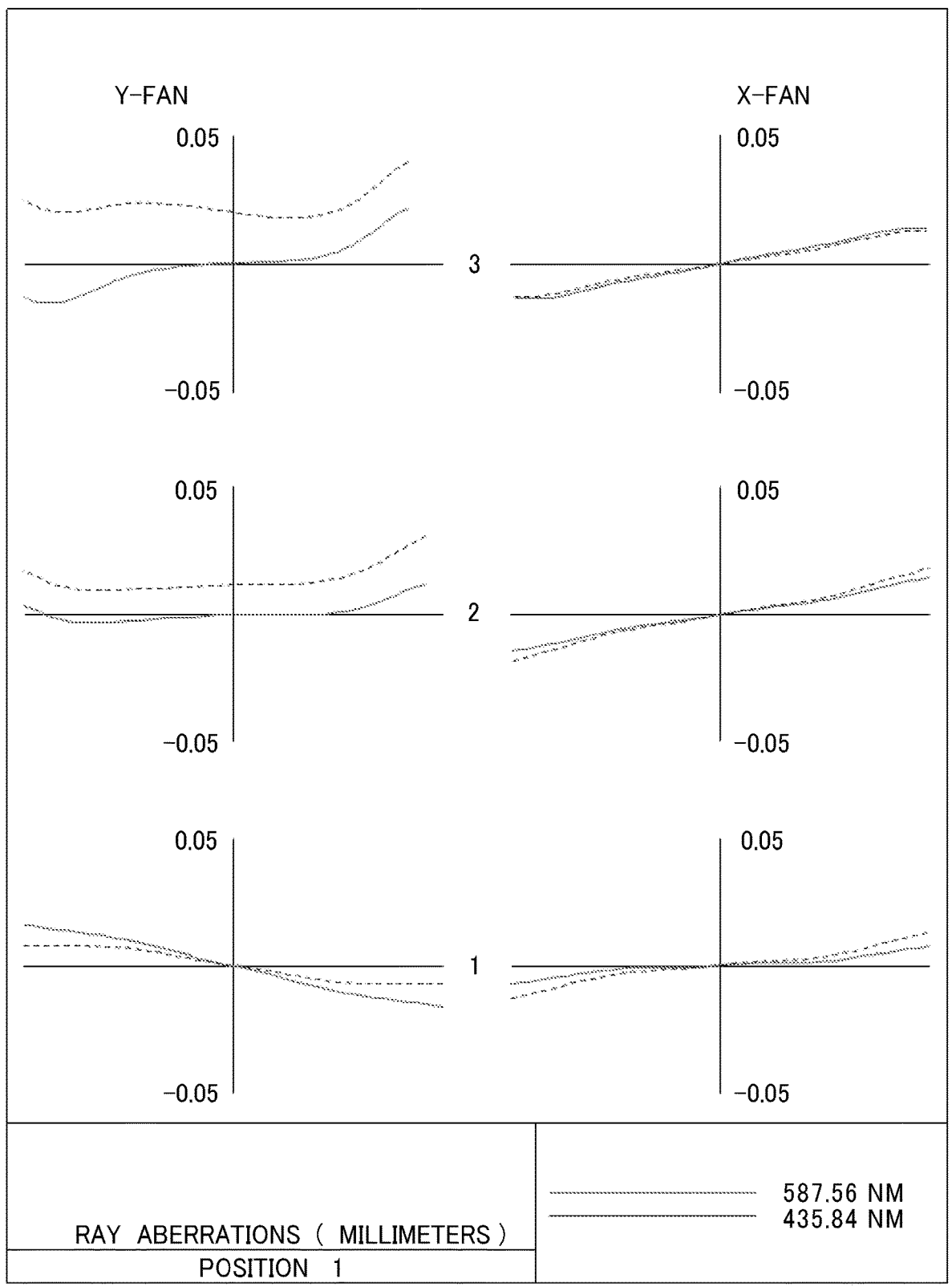
FIGS. 14A, 14B, and 14C are a diagram illustrating lateral aberration curves of Numerical Value Example 3.
Figure 14B:
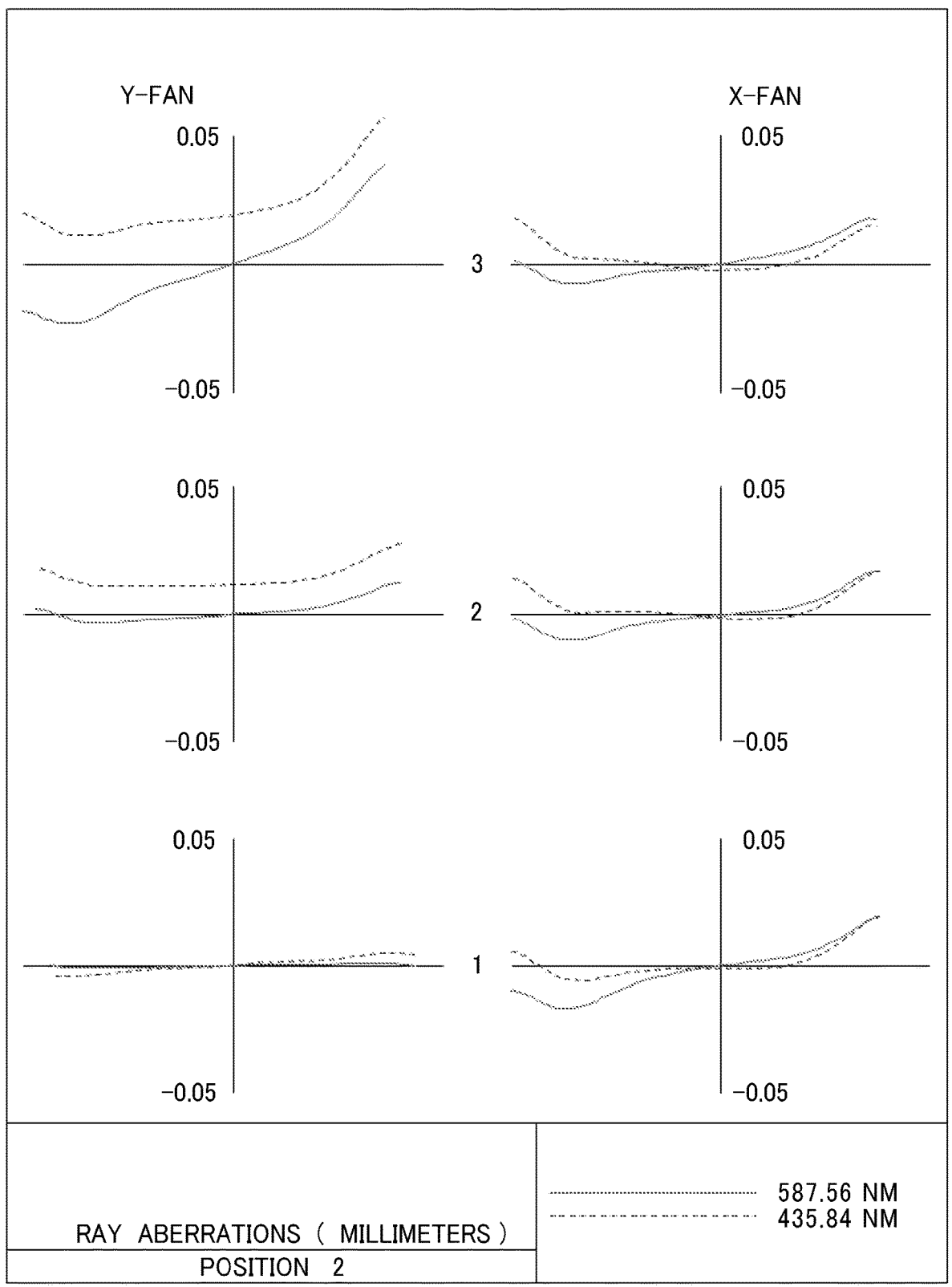
Figure 14C:
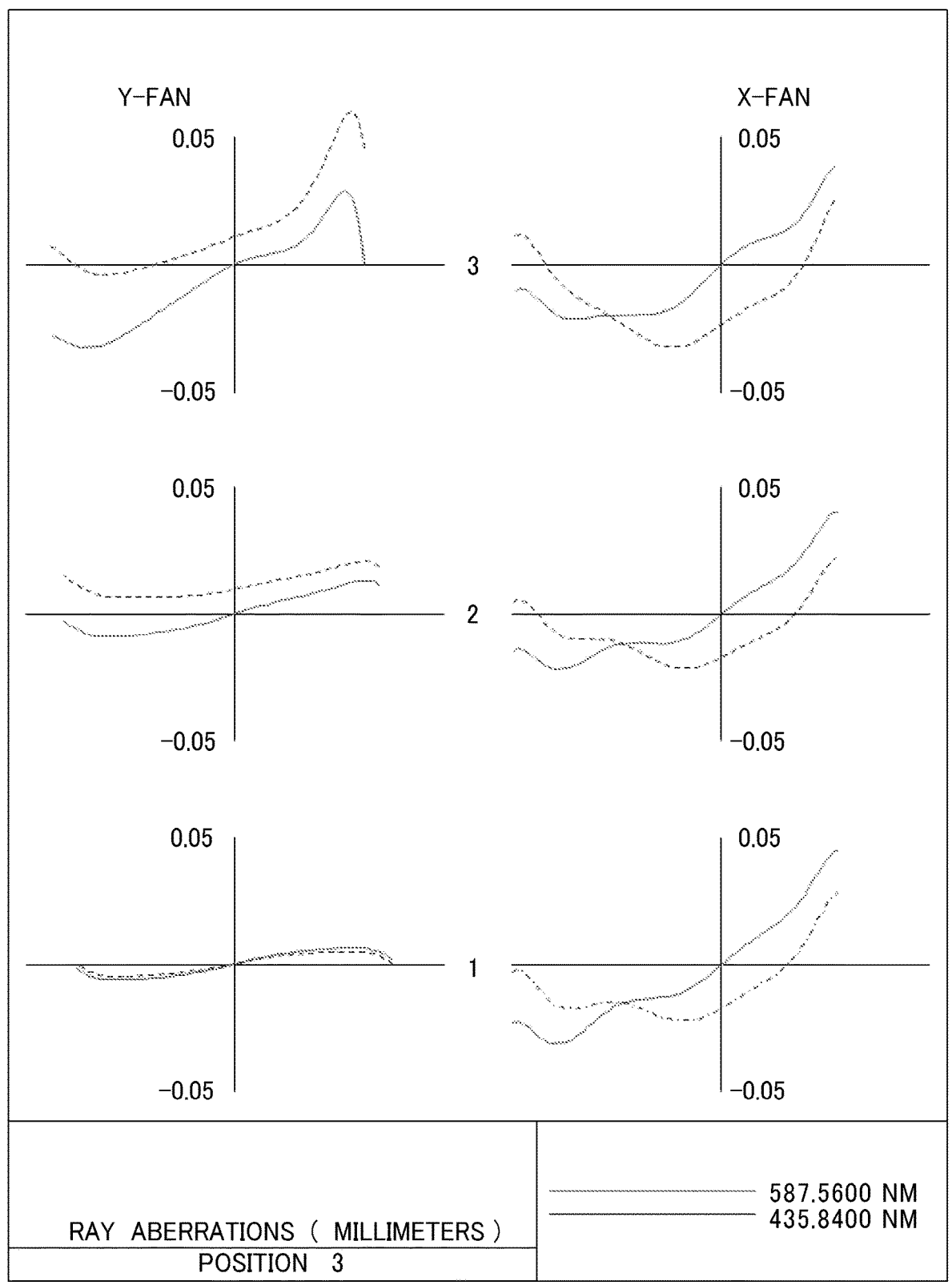

FIG. 13 illustrates an optical arrangement of Numerical Value Example 3 and FIG. 14 is an aberration diagram of the optical arrangement.

Field angle: vertical (X). 14.7 degrees; horizontal (Y). 31.9 degrees; diagonal, 34.5 degrees.

Virtual Image Distance: 0.5 m.

| | Rx | Ry | D | Nd | νd | |
|---|---|---|---|---|---|---|
| 0 | | | 13.10 | | | |
| 1 | −31.421 | −31.421 | 2.20 | 1.72000 | 50.23 | S-LAT10(OHARA) |
| 2 | −8.325 | −8.325 | 0.35 | | | |
| 3* | 18.488 | 18.488 | 1.41 | 1.53100 | 56 | E48R(ZEON) |
| 4* | 23.786 | 23.786 | 0.90 | | | |
| 5 | −15.423 | −15.423 | 0.96 | 1.78472 | 25.68 | S-TH11(OHARA) |
| 6 | 14.702 | 14.702 | 0.37 | | | |
| 7* | 7.446 | 7.446 | 2.42 | 1.53100 | 56 | E48R(ZEON) |
| 8* | −11.849 | −11.849 | 4.39 | | | |
| 9 | Diaphragm (aperture diameter: 6.5) | | 15.27 | | | |
| 10 | −60.430 | −60.430 | 3.50 | 1.53100 | 56 | E48R(ZEON) |
| 11* | −6.145 | −6.145 | 4.96 | | | |
| 12* | −6.170 | −6.170 | 0.90 | 1.53100 | 56 | E48R(ZEON) |
| 13* | 13.805 | 13.805 | 6.52 | | | |
| 14 | ∞ | 7.500 | 3.50 | 1.53100 | 56 | E48R(ZEON) |
| 15 | ∞ | ∞ | 3.04 | | | |
| 16* | −14.098 | −14.098 | 3.50 | 1.63200 | 23 | OKP4HT(Osaka Gas Chemicals) |
| 17 | 84.998 | 84.998 | 0.56 | | | |
| 18* | 168.216 | 168.216 | 4.37 | 1.53100 | 56 | E48R(ZEON) |
| 19 | −8.648 | −8.648 | 5.88 | | | |
| 20 | −12.070 | −12.070 | 3.24 | 1.53100 | 56 | E48R(ZEON) |
| 21* | −9.045 | −9.045 | 1.30 | | | |
| 22 | ∞ | ∞ | 42.69 | 1.53100 | 56 | E48R(ZEON) |
| 23 | ∞ | ∞ | 15.00 | | | |

Aspherical Coefficient

| | K | A4 | A6 | A8 | A10 |
|---|---|---|---|---|---|
| 3 | 0.000 | −2.04003E−03 | 1.57639E−04 | −1.15670E−05 | 2.25986E−07 |
| 4 | 0.000 | −3.34217E−03 | 3.56572E−04 | −2.38184E−05 | 8.44305E−07 |
| 7 | 0.000 | −1.98713E−03 | 1.22250E−04 | −4.50872E−06 | 8.25923E−08 |
| 8 | −18.323 | −1.64363E−03 | 4.92674E−05 | 0.00000E+00 | 0.00000E+00 |
| 11 | 0.000 | 1.64283E−03 | −3.86742E−08 | −2.07879E−07 | 1.96355E−08 |
| 12 | 0.000 | 7.61438E−04 | 2.01077E−06 | −2.68587E−07 | 2.52182E−08 |
| 13 | 0.000 | −4.40737E−03 | 1.33244E−04 | −3.02266E−06 | 3.38248E−08 |
| 16 | 0.000 | −8.81003E−05 | −5.35037E−05 | 2.04585E−06 | −5.34107E−08 |
| 18 | 0.000 | 1.12564E−04 | −3.96109E−06 | 5.43565E−08 | −3.79570E−10 |
| 21 | −0.329 | 1.86524E−05 | −6.56429E−07 | 1.09212E−08 | −9.43424E−11 |

Conditional Expression

| | |
|---|---|
| TLA/TL | 0.30 |
| TLC/TLR | 0.47 |
| Pos1/Y | −0.30 |
| β_relay | −1.68 |
| f_pmax/f_pmin | 0.00 |
| f_y/f_x | 0.00 |
| TLRa/TLR | 0.53 |
| f_r/f_rf | 0.63 |

Conditional Expression

| | |
|---|---|
| TLA/TL | 0.29 |
| TLC/TLR | 0.40 |
| Pos1/Y | −0.23 |
| β_relay | −1.54 |
| f_pmax/f_pmin | 0.27 |
| f_y/f_x | 0.27 |
| TLRa/TLR | 0.61 |
| f_r/f_rf | 0.52 |

Numerical Value Example 4

Figure 15:
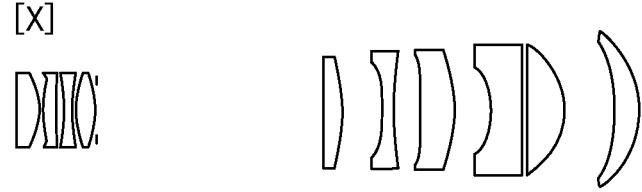
FIG. 15 is an optical arrangement diagram of Numerical Value Example 4 of the virtual image display device according to an embodiment of the present invention.
Figure 15:
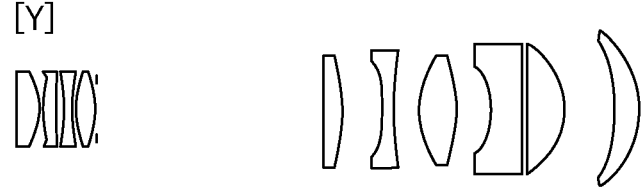
Figure 16A:
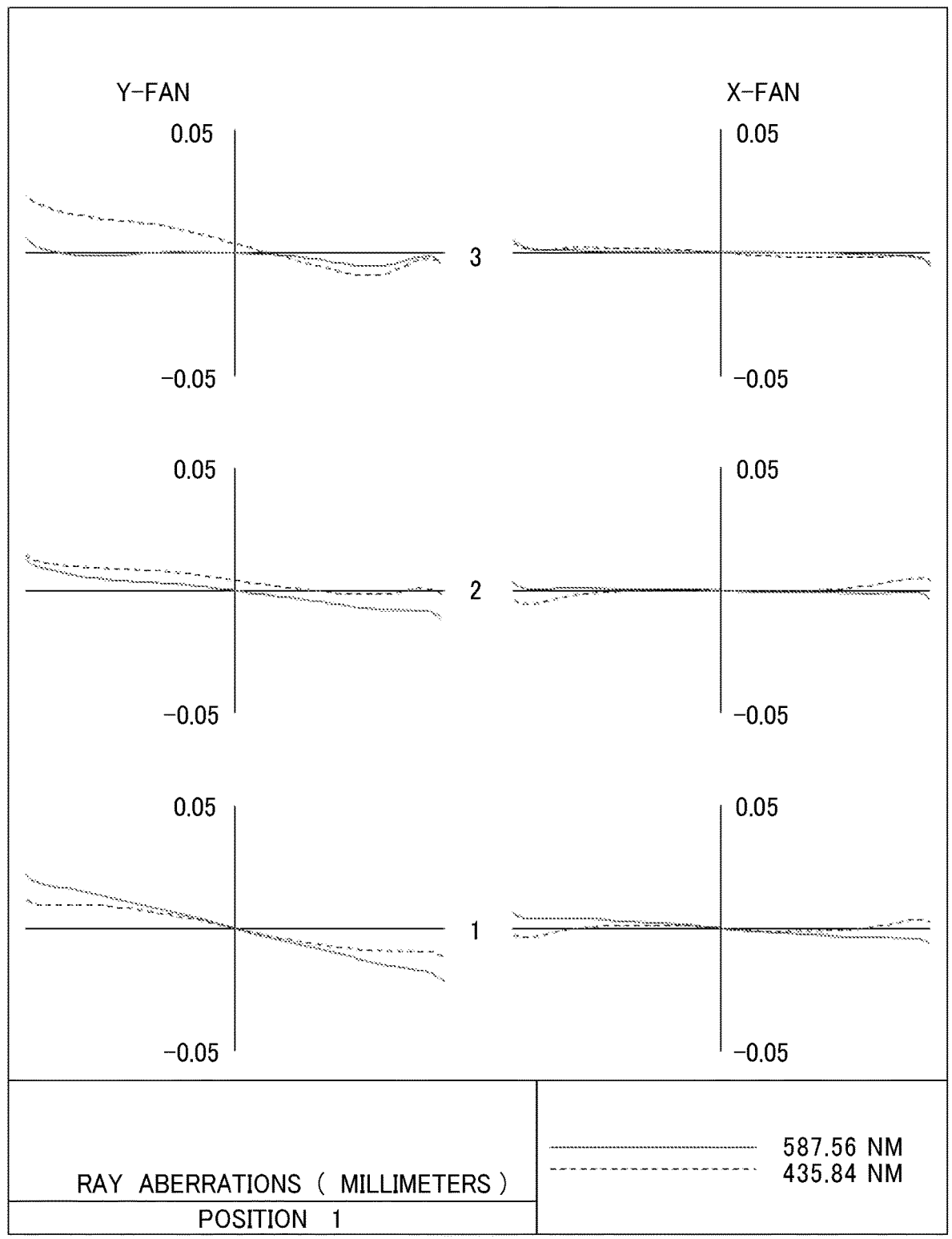
FIGS. 16A, 16B, and 16C are a diagram illustrating lateral aberration curves of Numerical Value Example 4.
Figure 16B:
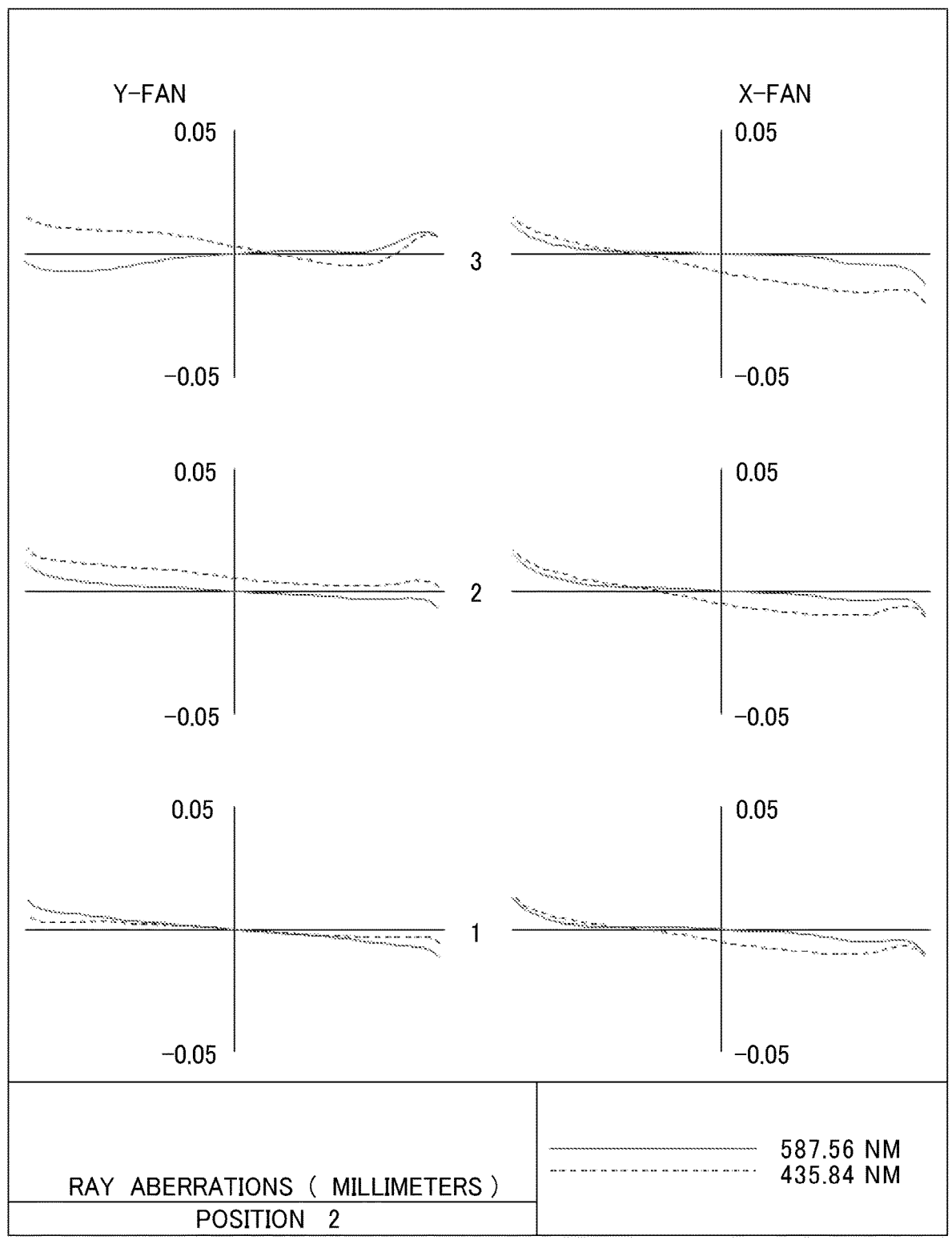
Figure 16C:
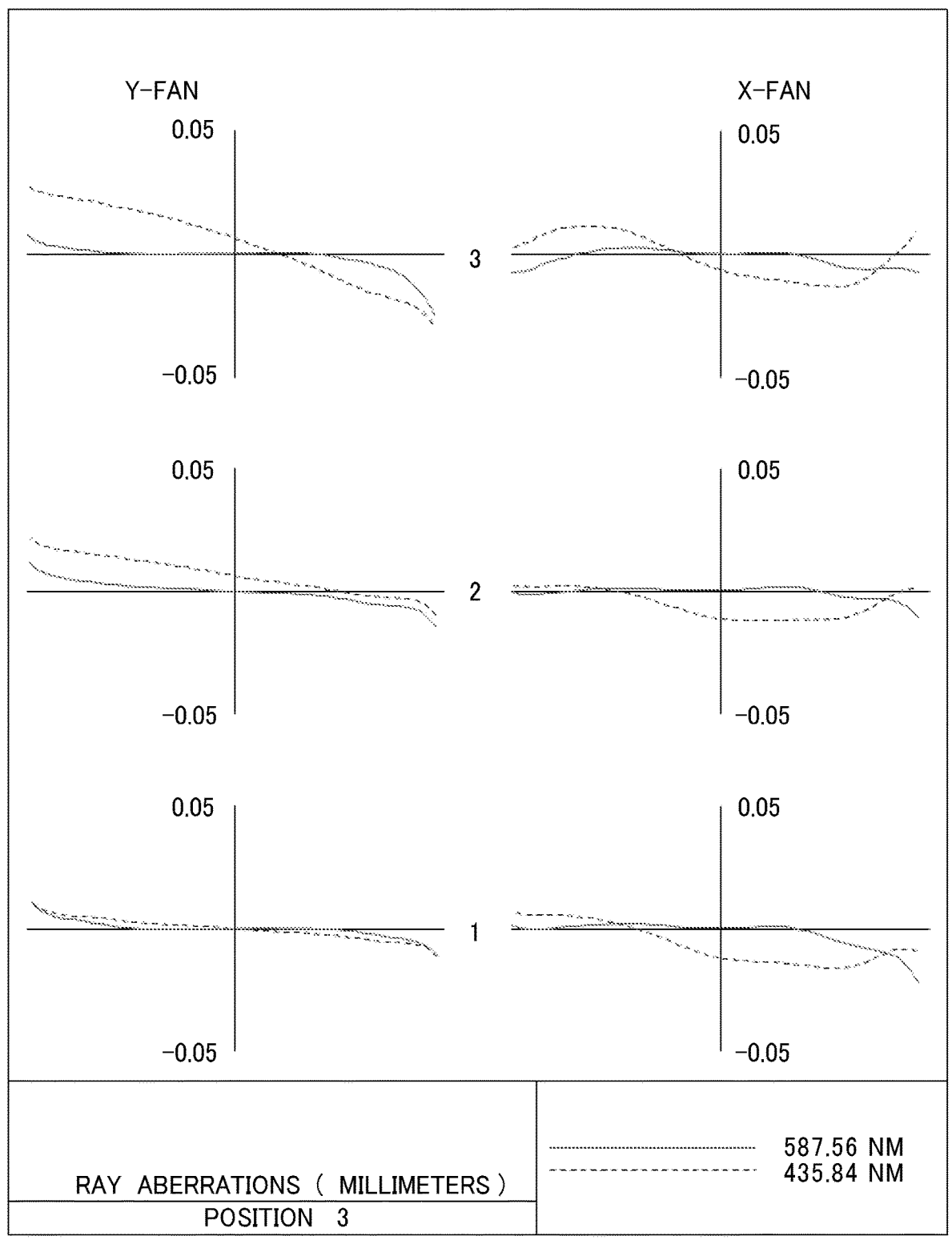

FIG. 15 illustrates an optical arrangement of Numerical Value Example 4 and FIG. 16 is an aberration diagram of the optical arrangement.

Field angle: vertical (X). 14.6 degrees; horizontal (Y). 31.9 degrees; diagonal. 35.0 degrees.
Virtual Image Distance: 3 m.

Numerical Value Example 5

Figure 17:
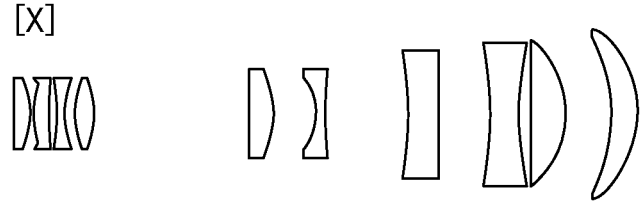
FIG. 17 is an optical arrangement diagram of Numerical Value Example 5 of the virtual image display device according to an embodiment of the present invention.
Figure 17:
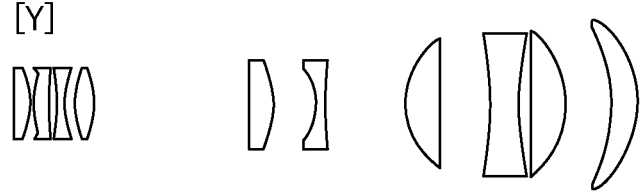
Figure 18A:
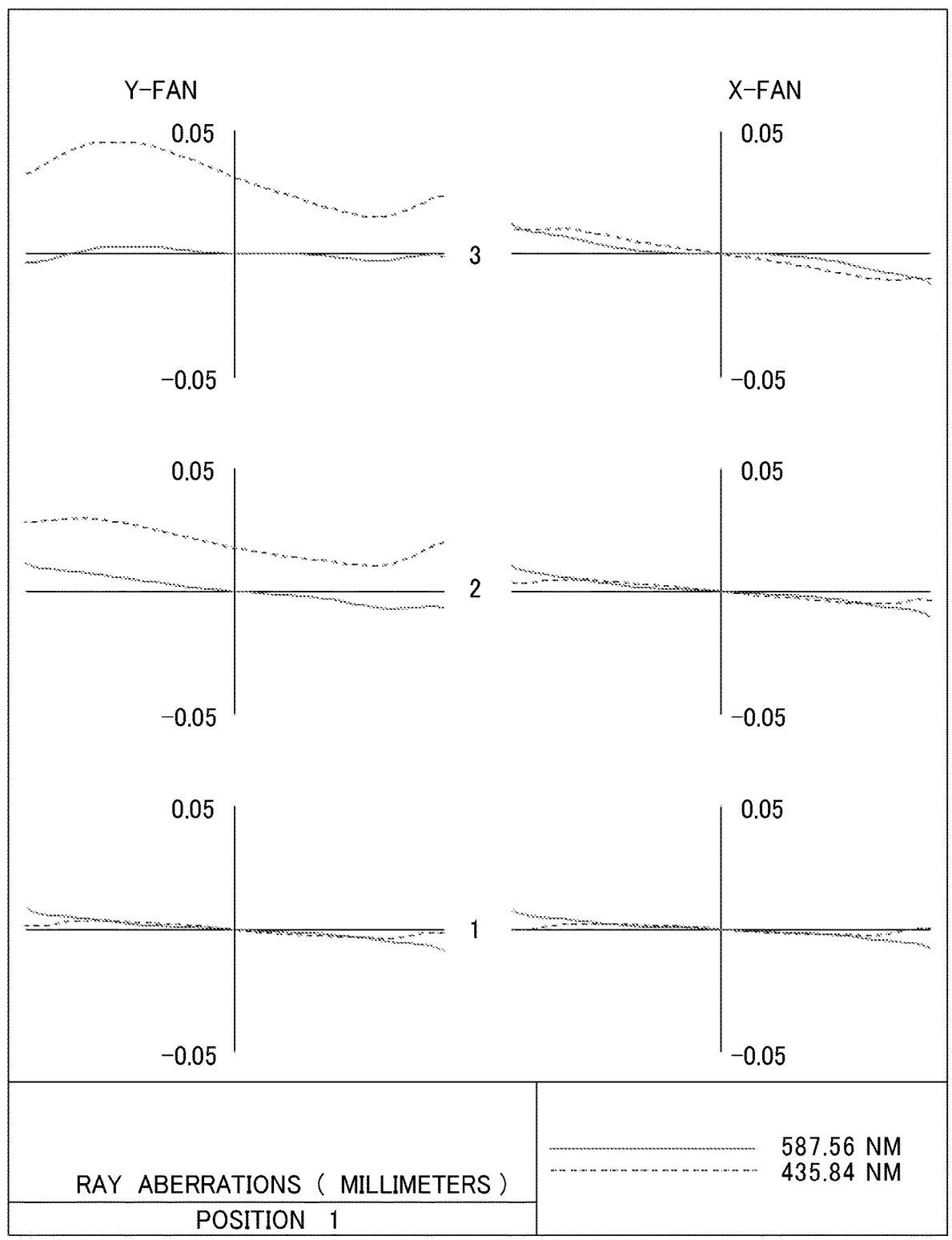
FIGS. 18A, 18B, and 18C are a diagram illustrating lateral aberration curves of Numerical Value Example 5.
Figure 18B:
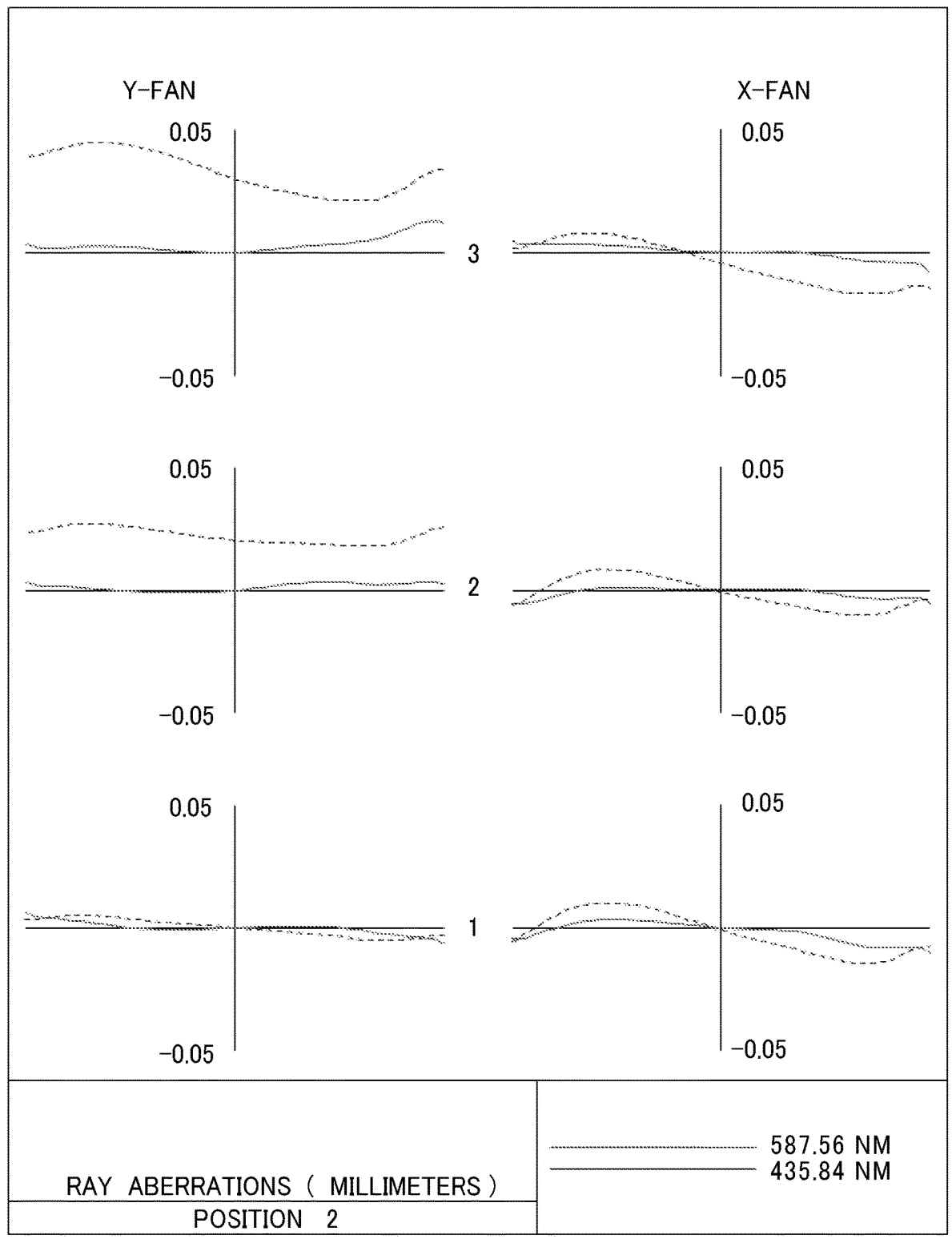
Figure 18C:
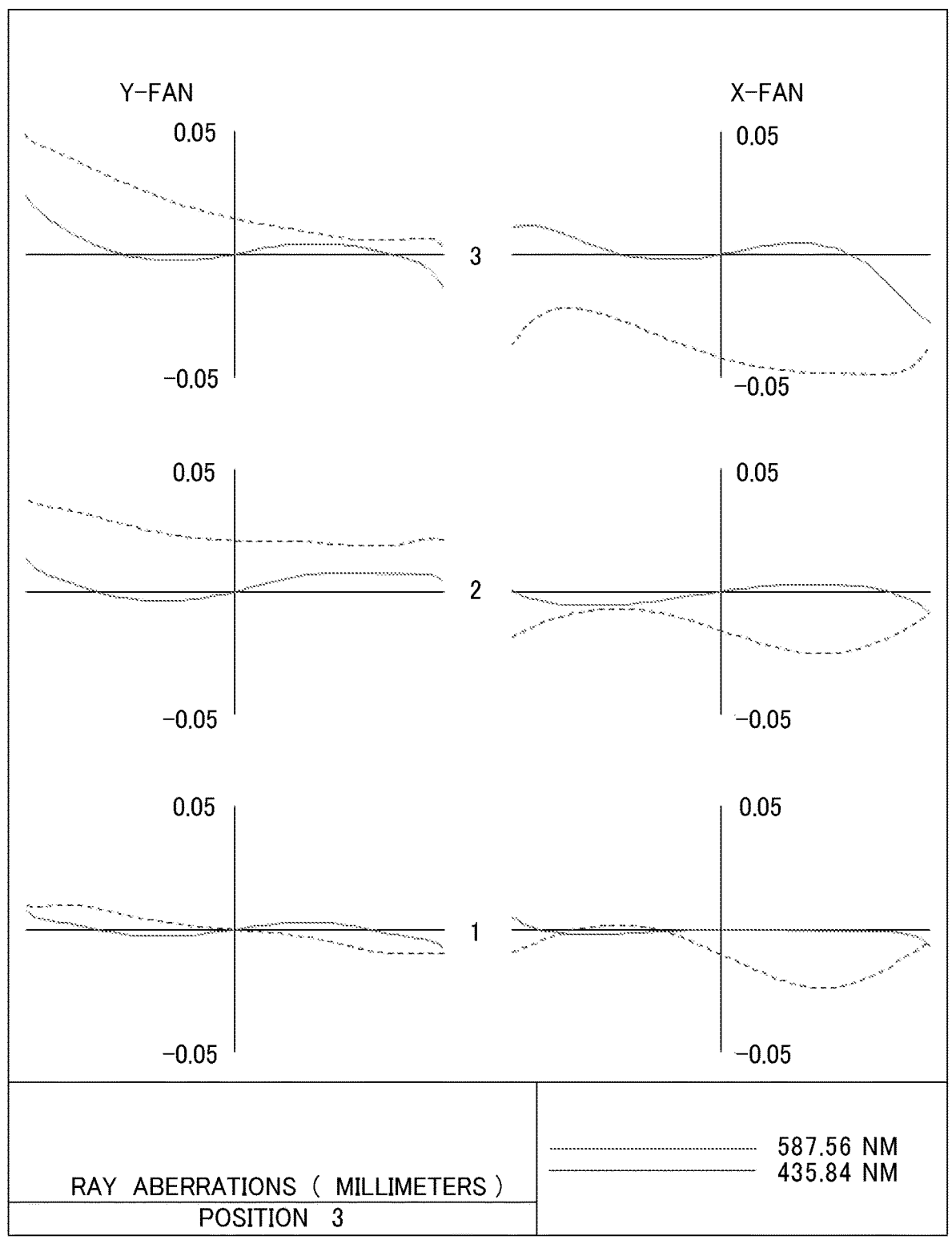
Figure 19:
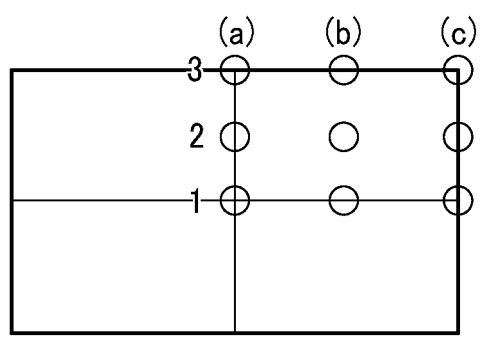
FIG. 19 is a diagram illustrating positions in which the lateral aberration curves of Numerical Value Examples 2 through 5 are calculated.

FIG. 17 illustrates an optical arrangement of Numerical Value Example 5 and FIG. 18 is an aberration diagram of the optical arrangement.

Field angle: vertical (X), 17.7 degrees; horizontal (Y), 33.9 degrees; diagonal, 37.8 degrees.
Virtual Image Distance: 1 m.

| | Rx | Ry | D | Nd | vd | |
|---|---|---|---|---|---|---|
| 0 | | | 13.37 | | | |
| 1 | −27.561 | −27.561 | 2.66 | 1.72000 | 50.23 | S-LAT10(OHARA) |
| 2 | −7.627 | −7.627 | 0.70 | | | |
| 3* | 23.756 | 23.756 | 0.98 | 1.53100 | 56 | E48R(ZEON) |
| 4* | 23.269 | 23.269 | 1.03 | | | |
| 5 | −17.748 | −17.748 | 0.90 | 1.78472 | 25.68 | S-TH11(OHARA) |
| 6 | 14.566 | 14.566 | 0.66 | | | |
| 7* | 7.507 | 7.507 | 1.91 | 1.53100 | 56 | E48R(ZEON) |
| 8* | −14.262 | −14.262 | 0.20 | | | |
| 9 | Diaphragm (aperture diameter: 5.6) | | 26.56 | | | |
| 10 | 63.277 | 63.277 | 2.63 | 1.53100 | 56 | E48R(ZEON) |
| 11* | −6.790 | −6.790 | 4.52 | | | |
| 12* | −7.109 | −7.109 | 0.90 | 1.53100 | 56 | E48R(ZEON) |
| 13* | 6.482 | 6.482 | 3.22 | | | |
| 14 | −52.222 | 9.543 | 4.29 | 1.53100 | 56 | E48R(ZEON) |
| 15 | −16.696 | −16.696 | 3.93 | | | |
| 16* | −11.524 | −11.524 | 3.50 | 1.63200 | 23 | OKP4HT(Osaka Gas Chemicals) |
| 17 | 68.565 | 68.565 | 0.75 | | | |
| 18* | 107.144 | 107.144 | 4.35 | 1.53100 | 56 | E48R(ZEON) |
| 19 | −8.688 | −8.688 | 6.06 | | | |
| 20 | −14.181 | −14.181 | 2.65 | 1.53100 | 56 | E48R(ZEON) |
| 21* | −9.943 | −9.943 | 1.30 | | | |
| 22 | ∞ | ∞ | 42.69 | 1.53100 | 56 | E48R(ZEON) |
| 23 | ∞ | ∞ | 15.00 | | | |

Aspherical Coefficient

| | K | A4 | A6 | A8 | A10 |
|---|---|---|---|---|---|
| 3 | 0.000 | −2.11869E−03 | 1.54855E−04 | −1.20888E−05 | 9.61201E−08 |
| 4 | 0.000 | −3.13844E−03 | 3.33470E−04 | −2.43840E−05 | 4.48462E−07 |
| 7 | 0.000 | −2.20112E−03 | 1.31503E−04 | −4.50844E−06 | 5.16797E−08 |
| 8 | −16.483 | −1.51146E−03 | 4.65667E−05 | 0.00000E+00 | 0.00000E+00 |
| 11 | 0.000 | 1.88090E−03 | −1.21797E−05 | 1.28368E−07 | 4.99799E−09 |
| 12 | 0.000 | 2.67201E−03 | −4.05754E−05 | −8.23356E−07 | 2.64914E−08 |
| 13 | 0.000 | −3.73580E−03 | 9.52096E−05 | −2.16178E−06 | 8.73577E−09 |
| 16 | 0.000 | −3.69405E−04 | −3.83950E−05 | 1.56136E−06 | −5.23428E−08 |
| 18 | 0.000 | 8.18820E−05 | −3.01089E−06 | 3.83630E−08 | 2.07529E−10 |
| 21 | −0.348 | 1.52156E−05 | −5.85543E−07 | 8.96290E−09 | −7.91705E−11 |

| | Rx | Ry | D | Nd | vd | |
|---|---|---|---|---|---|---|
| 0 | | | 13.00 | | | |
| 1 | −40.828 | −40.828 | 2.08 | 1.72000 | 50.23 | S-LAT10(OHARA) |
| 2 | −81.47 | −81.47 | 0.20 | | | |
| 3* | 7.399 | 7.399 | 1.70 | 1.53100 | 56 | E48R(ZEON) |
| 4* | 10.522 | 10.522 | 1.06 | | | |
| 5 | −12.279 | −12.279 | 0.90 | 1.78472 | 25.68 | S-TH11(OHARA) |
| 6 | 7.279 | 7.279 | 1.58 | | | |
| 7* | 5.302 | 5.302 | 2.03 | 1.53100 | 56 | E48R(ZEON) |
| 8* | −21.556 | −21.556 | 0.20 | | | |
| 9 | Diaphragm (aperture diameter: 5.0) | | 19.20 | | | |
| 10 | −1188.537 | −1188.537 | 2.81 | 1.53100 | 56 | E48R(ZEON) |
| 11* | −6.412 | −6.412 | 5.65 | | | |
| 12* | −9.521 | −9.521 | 0.90 | 1.53100 | 56 | E48R(ZEON) |
| 13* | 6.276 | 6.276 | 10.15 | | | |
| 14 | −81.522 | 10.000 | 4.00 | 1.53100 | 56 | E48R(ZEON) |
| 15 | ∞ | ∞ | 6.16 | | | |
| 16* | −1005.222 | −1005.222 | 3.50 | 1.63200 | 23 | OKP4HT(Osaka Gas Chemicals) |
| 17 | 34.185 | 34.185 | 1.27 | | | |
| 18* | 259.881 | 259.881 | 4.50 | 1.53100 | 56 | E48R(ZEON) |
| 19 | −11.476 | −11.476 | 5.46 | | | |
| 20 | −26.388 | −26.388 | 3.32 | 1.53100 | 56 | E48R(ZEON) |
| 21* | −13.230 | −13.230 | 1.30 | | | |
| 22 | ∞ | ∞ | 42.69 | 1.53100 | 56 | E48R(ZEON) |
| 23 | ∞ | ∞ | 15.00 | | | |

Aspherical Coefficient

| | K | A4 | A6 | A8 | A10 |
|---|---|---|---|---|---|
| 3 | 0.000 | −8.86352E−04 | 6.47164E−05 | 2.02060E−06 | −1.90339E−07 |
| 4 | 0.000 | −3.55932E−03 | 3.11788E−04 | −7.54133E−06 | −6.97683E−08 |
| 7 | 0.000 | −3.89265E−03 | 6.77320E−05 | −9.88174E−07 | −8.04133E−08 |
| 8 | −50.365 | −1.92658E−03 | 9.30719E−06 | 0.00000E+00 | 0.00000E+00 |
| 11 | 0.000 | 1.40363E−03 | −1.03584E−05 | 1.25719E−07 | 7.32487E−09 |
| 12 | 0.000 | −3.80516E−04 | −1.07816E−04 | 2.60675E−06 | 1.25972E−08 |
| 13 | 0.000 | −5.58289E−03 | 1.13652E−04 | −2.26208E−06 | 2.19595E−08 |
| 16 | 0.000 | −6.40844E−05 | −6.17750E−06 | −2.92187E−08 | 7.05621E−10 |
| 18 | 0.000 | −2.19029E−04 | 6.00350E−06 | −5.54935E−08 | 1.59469E−10 |
| 21 | 0.055 | −2.36160E−05 | 4.15573E−07 | −2.57232E−09 | 6.44594E−12 |

Conditional Expression

| | |
|---|---|
| TLA/TL | 0.32 |
| TLC/TLR | 0.47 |
| Pos1/Y | 0.08 |
| β_relay | −2.14 |
| f_pmax/f_pmin | −0.12 |
| f_y/f_x | −0.12 |
| TLRa/TLR | 0.51 |
| f_r/f_rf | 0.57 |

In each aberration diagram, calculation is made assuming that an image is formed with an ideal lens having a focal length of 17 mm. In each of the numerical value examples, aberrations are corrected on a high level. It is evident from the examples of the present invention that a very good image performance is secured with a horizontal field angle of 30 degrees or larger by constructing the propagation optical system as in the respective examples of the present invention.

In the above-described examples, the virtual image display device capable of obtaining a wide viewing angle of 30 degrees or more and enhancing light use efficiency is achieved.

While preferred embodiments of the present invention have been described above, the present invention is in no way limited to such particular embodiments. Various modifications and changes may be made within the scope of the gist of the invention as recited in the claims as long as no particular limitations are made in the description as above.

The surface of a curved surface shape that is non-rotationally symmetric may be a spherical surface in a given cross section, or may be an aspherical surface or a free-form surface in order to improve the degree of freedom for design.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application Nos. 2019-053317, filed on Mar. 20, 2019, and 2020-018516, filed on Feb. 6, 2020, in the Japan Patent Office, the entire disclosure of which is hereby incorporated by reference herein.

REFERENCE SIGNS LIST

100 image display element
200 propagation optical system
201 intermediate image
204 curved surface optical member
300 light guide plate 301 light beam incident part
303 image extractor
304 image emitter

The invention claimed is:
1. A virtual image display device comprising:
an image display configured to display an image to be displayed as a virtual image;
a propagation optical system configured to propagate light from the image display; and
a light guide configured to guide the light propagated by the propagation optical system,
the light guide including:
a light beam incident part that introduces light including image information from the propagation optical system into the light guide;
an image extractor that extracts the light including image information from an inside of the light guide; and
an image emitter that emits the light including image information to an outside of the light guide,
wherein the propagation optical system includes one or more optical elements each having a curved surface shape that is non-rotationally symmetric with respect to an optical axis,
wherein the propagation optical system includes a relay optical system that forms an intermediate image of the image displayed on the image display on a side facing the image display, and a collimator optical system on a side facing the light guide, and
wherein the one or more optical elements each having a curved surface shape that is non-rotationally symmetric with respect to the optical axis are provided in at least one of the relay optical system and the collimator optical system.

2. The virtual image display device according to claim 1, wherein the propagation optical system causes nearly parallel light to enter the light beam incident part of the light guide.

3. A virtual image display device, comprising:
an image display configured to display an image to be displayed as a virtual image;
a propagation optical system configured to propagate light from the image display; and
a light guide configured to guide the light propagated by the propagation optical system,
the light guide including:
a light beam incident part that introduces light including image information from the propagation optical system into the light guide;
an image extractor that extracts the light including image information from an inside of the light guide; and
an image emitter that emits the light including image information to an outside of the light guide,
wherein the propagation optical system includes one or more optical elements each having a curved surface shape that is non-rotationally symmetric with respect to an optical axis,
wherein the propagation optical system further includes a collimator optical system, and the one or more optical elements each having a curved surface shape that is non-rotationally symmetric with respect to the optical axis are disposed on a side facing the image display.

4. A virtual image display device, comprising:
an image display configured to display an image to be displayed as a virtual image;
a propagation optical system configured to propagate light from the image display; and
a light guide configured to guide the light propagated by the propagation optical system,
the light guide including:
a light beam incident part that introduces light including image information from the propagation optical system into the light guide;
an image extractor that extracts the light including image information from an inside of the light guide; and
an image emitter that emits the light including image information to an outside of the light guide,
wherein the propagation optical system includes one or more optical elements each having a curved surface shape that is non-rotationally symmetric with respect to an optical axis,
wherein the propagation optical system is non-telecentric on a side facing the image display.

5. The virtual image display device according to claim 1, wherein the collimator optical system of the propagation optical system is non-telecentric on a side facing the intermediate image.

6. The virtual image display device according to claim 1, wherein the one or more optical elements each having a curved surface shape that is non-rotationally symmetric with respect to the optical axis are disposed proximately to the intermediate image.

7. The virtual image display device according to claim 1, wherein: the collimator optical system and satisfies a conditional expression below:

$$0.1<TLA/TL<0.5,$$

where TLA represents a distance from a surface of the curved surface shape that is non-rotationally symmetric with respect to the optical axis to a surface of the collimator optical system that is closest to the light guide, and TL represents a distance from a surface of the relay optical system that is closest to the image display to the surface of the collimator optical system that is closest to the light guide.

8. The virtual image display device according to claim 1, wherein: the collimator optical system and satisfies a conditional expression below:

$$0.3<TLC/TLR<0.6,$$

where TLC represents a thickness of the collimator optical system, and TLR represents a thickness of the relay optical system.

9. The virtual image display device according to claim 1, wherein: the collimator optical system and satisfies a conditional expression below:

$$-0.5<Pos1/Y<0.5,$$

where Y represents a size in a diagonal direction of the image display, and Pos1 represents a position of a surface of the curved surface shape that is non-rotationally symmetric when a position of the intermediate image is taken as a reference, provided that Pos1 is of a negative value if the surface of the curved surface shape that is non-rotationally symmetric is located on a side facing the image display.

10. The virtual image display device according to claim 1, wherein:
the collimator optical system and satisfies a conditional expression below:

$$-3.0<\beta\_relay<-1.0,$$

where $\beta\_relay$ represents a lateral magnification of the relay optical system.

11. The virtual image display device according to claim 1, wherein: the collimator optical system and satisfies a conditional expression below:

$$-0.5 < f\_p\,\text{max}/f\_p\,\text{min} < 0.5,$$

where f_pmax represents a focal length of the optical element having the curved surface shape that is non-rotationally symmetric with respect to the optical axis in a cross section having a strongest positive power of the curved surface shape that is rotationally asymmetric, and f_pmin represents the focal length of the optical element having the curved surface shape that is non-rotationally symmetric with respect to the optical axis in a cross section having a weakest positive power of the curved surface shape that is rotationally asymmetric.

12. The virtual image display device according to claim 1, wherein: the collimator optical system and satisfies a conditional expression below:

$$-0.5 < f\_y/f\_x < 0.5$$

where f_y represents a focal length of the optical element having the curved surface shape that is non-rotationally symmetric with respect to the optical axis in a cross section in a long side direction of the image display, and f_x represents the focal length of the optical element having the curved surface shape that is non-rotationally symmetric with respect to the optical axis in a cross section in a short side direction of the image display.

13. The virtual image display device according to claim 1, wherein the relay optical system includes a relay front group having a positive power and a relay rear group in order from a side facing the image display, and a spacing between the relay front group and the relay rear group is a largest spacing in the relay optical system.

14. The virtual image display device according to claim 13, wherein the virtual image display device satisfies a conditional expression below:

$$0.4 < TLRa/TLR < 0.7$$

where TLR represents a thickness of the relay optical system, and TLRa represents the spacing between the relay front group and the relay rear group.

15. The virtual image display device according to claim 13, wherein the virtual image display device satisfies a conditional expression below:

$$0.4 < f\_r/f\_rf < 0.8,$$

where f_r represents a focal length of a relay group, and f_rf represents a focal length of the relay front group.

16. The virtual image display device according to claim 1, wherein the curved surface of each of the one or more optical elements that is non-rotationally symmetric with respect to the optical axis has a toroidal surface shape.

17. The virtual image display device according to claim 1, wherein the curved surface of each of the one or more optical elements that is non-rotationally symmetric with respect to the optical axis has a cylindrical surface shape.

18. The virtual image display device according to claim 1, wherein the one or more optical elements each having a curved surface shape that is non-rotationally symmetric with respect to the optical axis of the propagation optical system each have a positive power in a direction corresponding to a horizontal direction of the virtual image.

19. The virtual image display device according to claim 3, wherein the propagation optical system includes a relay optical system, an optical element having a curved surface shape that is non-rotationally symmetric with respect to the optical axis, and a collimator optical system in order from a side facing the image display,
wherein the propagation optical system includes an intermediate image between the relay optical system and the collimator optical system, and
wherein the relay optical system includes a relay front group having a positive power and a relay rear group in order from a side facing the image display, and a spacing between the relay front group and the relay rear group is a largest spacing in the relay optical system.

20. The virtual image display device according to claim 4, wherein the propagation optical system includes a relay optical system, an optical element having a curved surface shape that is non-rotationally symmetric with respect to the optical axis, and a collimator optical system in order from a side facing the image display,
wherein the propagation optical system includes an intermediate image between the relay optical system and the collimator optical system, and
wherein the relay optical system includes a relay front group having a positive power and a relay rear group in order from a side facing the image display, and a spacing between the relay front group and the relay rear group is a largest spacing in the relay optical system.

* * * * *